US012149479B2

(12) United States Patent
Park

(10) Patent No.: US 12,149,479 B2
(45) Date of Patent: Nov. 19, 2024

(54) METHOD FOR PERFORMING HARQ FEEDBACK PROCEDURE

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 711 days.

(21) Appl. No.: 17/246,713

(22) Filed: May 2, 2021

(65) Prior Publication Data

US 2021/0288778 A1    Sep. 16, 2021

Related U.S. Application Data

(63) Continuation of application No. PCT/KR2019/014673, filed on Nov. 1, 2019.

(30) Foreign Application Priority Data

Nov. 2, 2018 (KR) .................. 10-2018-0133931
Jul. 10, 2019 (KR) .................. 10-2019-0083465

(51) Int. Cl.
*H04L 5/00* (2006.01)
*H04L 1/1812* (2023.01)
*H04W 4/40* (2018.01)

(52) U.S. Cl.
CPC .......... *H04L 5/0055* (2013.01); *H04L 1/1812* (2013.01); *H04W 4/40* (2018.02)

(58) Field of Classification Search
CPC ....... H04L 5/0055; H04L 1/1812; H04W 4/40
See application file for complete search history.

(56) References Cited

U.S. PATENT DOCUMENTS

| 2017/0094657 | A1 | 3/2017 | Yoon | |
| 2020/0029318 | A1* | 1/2020 | Guo | ................. H04L 1/1822 |
| 2020/0099479 | A1* | 3/2020 | Park | ................. H04W 4/70 |
| 2020/0112400 | A1* | 4/2020 | Lee | ................. H04L 1/1819 |

FOREIGN PATENT DOCUMENTS

| EP | 2487853 A2 | 8/2012 |
| WO | 2017052489 A1 | 3/2017 |
| WO | 2018151637 A1 | 8/2018 |

OTHER PUBLICATIONS

International Search Report for International Patent Application No. PCT/KR2019/014673, dated Feb. 12, 2020.
Written Opinion for International Patent Application No. PCT/KR2019/014673, dated Feb. 12, 2020.
(Continued)

*Primary Examiner* — Justin T Van Roie

(57) ABSTRACT

A method of performing, by a terminal, a Hybrid Automatic Repeat and Request (HARQ) feedback procedure in a new radio (NR) vehicle-to-everything (V2X) system may include receiving sidelink (SL) data from a transmitting (Tx) terminal, determining a PSFCH resource including feedback information about the received sidelink data, and transmitting a PSFCH to the Tx terminal through the determined PSFCH resource.

10 Claims, 28 Drawing Sheets

(56) References Cited

OTHER PUBLICATIONS

"3rd Generation Partnership Project; Technical Specification Group Radio Access Network; NR; Multiplexing and channel coding (Release 15)", 3GPP TS 38.212 V15.3.0, Sep. 2018, pp. 1-99, 3GPP Organizational Partners.

"3rd Generation Partnership Project; Technical Specification Group Radio Access Network; NR; Physical layer procedures for control (Release 15)", 3GPP TS 38.213 V15.3.0, Sep. 2018, pp. 1-101, 3GPP Organizational Partners.

Huawei, HiSilicon, "Sidelink PHY structure and procedure for NR V2X", 3GPP TSG RAN WG1 Meeting #94bis, R1-1810138, Chengdu, China, Oct. 8-12, 2018.

Huawei, HiSilicon, "V2X sidelink channel model", 3GPP TSG RAN WG1 Meeting #92-Bis R1-1803671, Sanya, China, Apr. 16-20, 2018.

Ericsson, "On HARQ Feedback Timing", 3GPP TSG-RAN WG1 Meeting#90 R1-1714439, Prague, Czech Republic, Aug. 21-25, 2017.

Qualcomm Incorporated, "Considerations on Physical Layer aspects of NH V2X", 3GPP TSG-RAN WG1 Meeting #94bis, R1-1811261, Chengdu, China, Oct. 8-12, 2018, pp. 1-11.

Extended European Search Report for EP Application No. 19877820.1-1213. Dated Jul. 11, 2022.

\* cited by examiner

FIG. 8
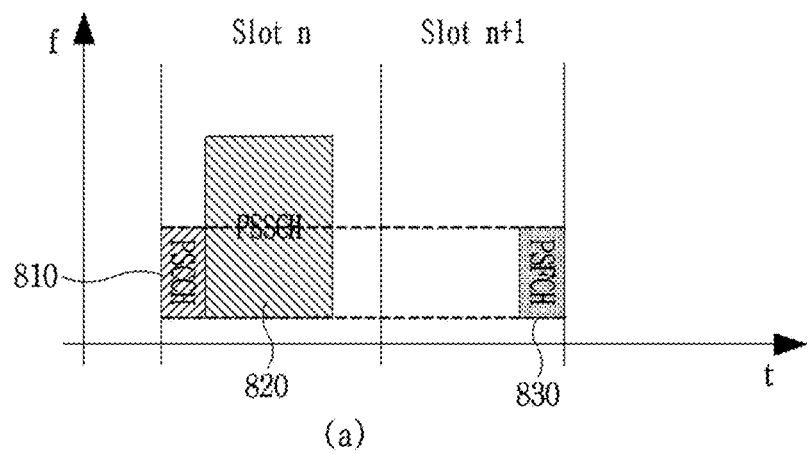
(a)
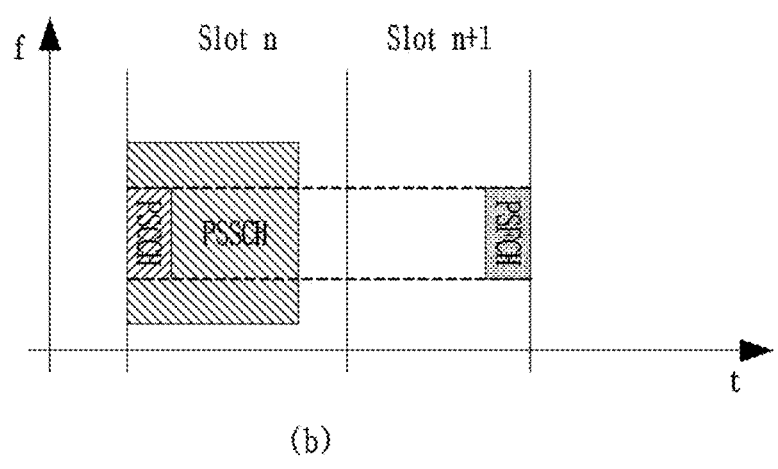
(b)

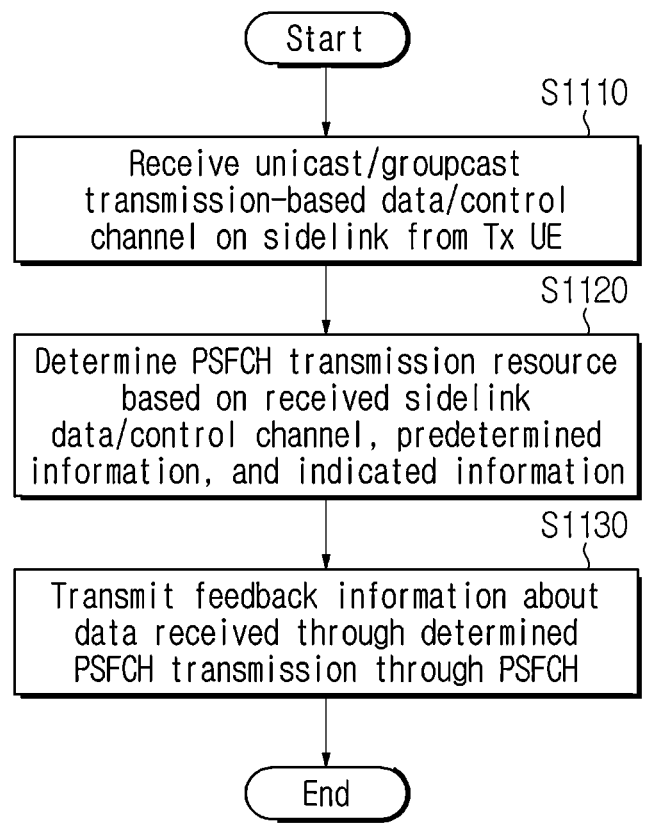

FIG. 13B

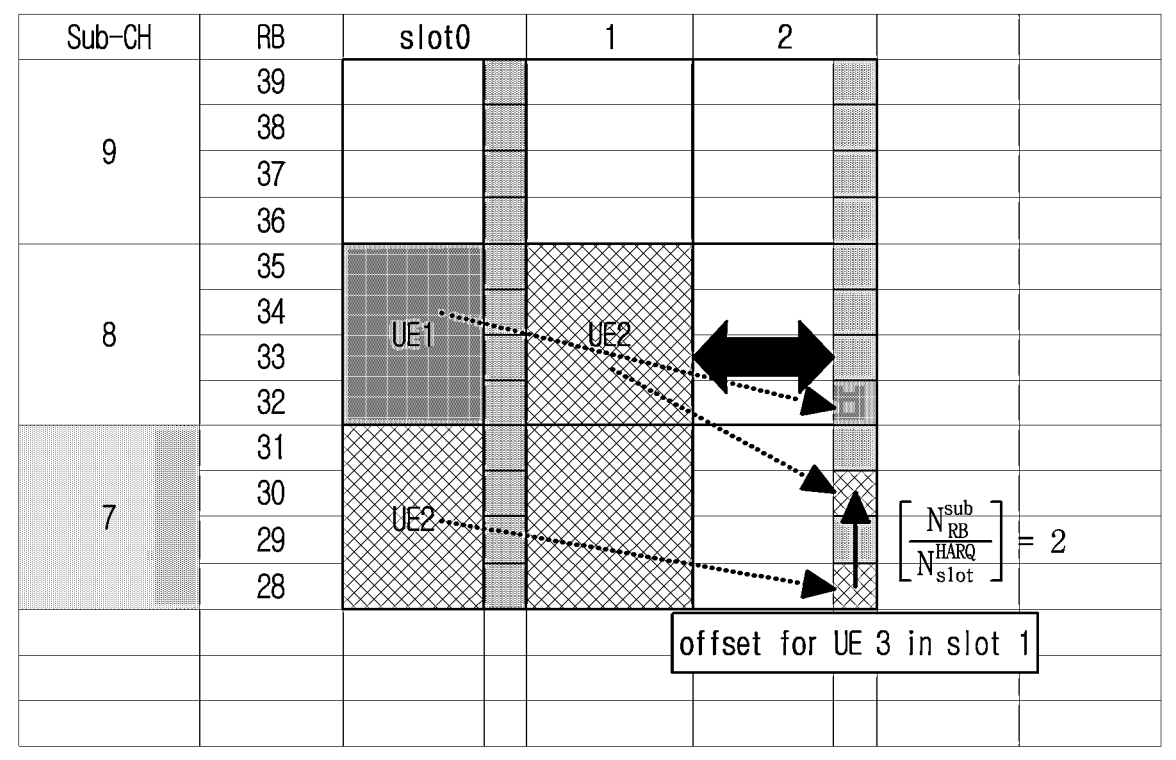

| Sub-CH | RB | slot0 | 1 | 2 | | |
|---|---|---|---|---|---|---|
| 9 | 39 | | | | | |
| | 38 | | | | | |
| | 37 | | | | | |
| | 36 | | | | | |
| 8 | 35 | | | | | |
| | 34 | UE1 | UE2 | | | |
| | 33 | | | | | |
| | 32 | | | | | |
| 7 | 31 | | | | | |
| | 30 | UE2 | | | | |
| | 29 | | | | | |
| | 28 | | | | | |

$$\left\lceil \frac{N_{RB}^{sub}}{N_{slot}^{HARQ}} \right\rceil = 2$$

offset for UE 3 in slot 1

METHOD FOR PERFORMING HARQ FEEDBACK PROCEDURE

CROSS-REFERENCE TO RELATED APPLICATIONS

This application is a continuation of PCT International patent application No. PCT/KR2019/014673, filed on Nov. 1, 2019, which claims priority from and the benefit of Korean Patent Application Nos. 10-2018-0133931, filed on Nov. 2, 2018, and 10-2019-0083465, filed on Jul. 10, 2019, each of which is hereby incorporated by reference in its entirety.

BACKGROUND

1. Field

The present disclosure relates to a method of transmitting and receiving Hybrid Automatic Repeat and Request (HARQ) feedback in a new radio (NR) vehicle-to-everything (V2X) system and a method of performing an HARQ feedback procedure.

2. Discussion of the Background

International Mobile Telecommunication (IMT) framework and standard are being developed in the International Telecommunication Union (ITU). Also, in the recent times, discussion for 5-th generation (5G) communication is ongoing through a program called "IMT for 2020 and beyond."

To meet the requirements requested by "IMT for 2020 and beyond," discussion is being made to support various numerologies about a time-frequency resource unit standard by considering various scenarios, service requirements, and potential system compatibility in a 3-rd Generation Partnership Project (3GPP) new radio (NR) system.

In addition, Vehicle-to-everything (V2X) communication refers to a communication method of exchanging or sharing road infrastructures during driving and information, such as traffic conditions, through communication with other vehicles. V2X may include, for example, vehicle-to-vehicle (V2V) that refers to long term evolution (LTE)-based communication between vehicles, vehicle-to-pedestrian (V2P) that refers to LTE-based communication between a vehicle and a user equipment (UE) carried by a user, and vehicle-to-infrastructure/network (V2I/N) that refers to LTE-based communication between a vehicle and a roadside unit (RSU)/network. Here, the RSU may be a transportation infrastructure entity configured by a base station or a fixed terminal, such as, for example, an entity that transmits a speed notification to a vehicle.

SUMMARY

The present disclosure may provide a method and apparatus for performing Hybrid Automatic Repeat and Request (HARQ) feedback in a new radio (NR) vehicle-to-everything (V2X) system.

The present disclosure may provide a method and apparatus for transmitting, by an NR V2X sidelink (SL) user equipment (UE), HARQ feedback.

The present disclosure may provide a method and apparatus for determining a time resource of a Physical Sidelink Feedback Channel (PSFCH) through which feedback information is transmitted in an NR V2X sidelink.

The present disclosure may provide a method and apparatus for determining a frequency resource of a PSFCH through which feedback information is transmitted in an NR V2X sidelink.

The present disclosure may provide a method and apparatus for preventing a collision of feedback information transmitted in an NR V2X sidelink.

The present disclosure may provide a method and apparatus for performing a PSFCH transmission in a single slot in response to a single Physical Sidelink Shared Channel (PSSCH) in an NR V2X sidelink.

The present disclosure may provide a method and apparatus for performing a PSFCH transmission in a single slot in response to at least one PSSCH in at least one slot in an NR V2X sidelink.

The present disclosure may provide a method of performing, by a user equipment (UE), a Hybrid Automatic Repeat and Request (HARQ) feedback procedure in a new radio (NR) vehicle-to-everything (V2X) system. Here, the method of performing, by the UE, the HARQ feedback procedure may include receiving sidelink data from a transmitting (Tx) UE and transmitting feedback information about the received sidelink data to the Tx UE through a Physical Sidelink Feedback Channel (PSFCH). Here, a time resource of the PSFCH may be determined based on a slot in which sidelink data is received and a frequency resource of the PSFCH may be determined based on at least one of a frequency resource of a Physical Sidelink Control Channel (PSCCH) and a frequency resource of a Physical Sidelink Shared Channel (PSSCH) in which sidelink data is received.

The present disclosure may provide a method of performing, by a UE, an HARQ feedback procedure in an NR V2X system. Here, the method of performing, by the UE, the HARQ feedback procedure in the NR V2X system may include receiving sidelink (SL) data from a Tx UE, determining a PSFCH resource including feedback information about the received sidelink data, and transmitting a PSFCH to the Tx UE through the determined PSFCH resource. Here, the SL data may be transmitted based on a subchannel, and a Physical Resource Block (PRB) index of the PSFCH transmission including HARQ-ACK feedback transmission corresponding to an SL data channel (i.e., PSSCH) may be determined based on at least one of a PSFCH format type (e.g., a 1 PRB PSFCH format or a PSFCH format allocated to 1 PRB or more), a cast type (e.g., unicast or groupcast), an SL physical layer ID, a PRB offset, a subchannel index, a logical or physical slot index, an HARQ association set, the number of code resources per PRB, whether to apply frequency hopping, whether to configure a slot aggregation for PSSCH transmission, whether to apply SL HARQ-ACK bundling, the number of SL HARQ-ACK information bits (e.g., ≤2 or >2), and the number of resource blocks per subchannel.

According to the present disclosure, there may be provided a method and apparatus for performing Hybrid Automatic Repeat and Request (HARQ) feedback in a new radio (NR) vehicle-to-everything (V2X) system.

According to the present disclosure, there may be provided a method and apparatus for transmitting, by an NR V2X sidelink (SL) user equipment (UE), HARQ feedback.

According to the present disclosure, there may be provided a method and apparatus for determining a time resource of a Physical Sidelink Feedback Channel (PSFCH) through which feedback information is transmitted in an NR V2X sidelink.

According to the present disclosure, there may be provided a method and apparatus for determining a frequency resource of a PSFCH through which feedback information is transmitted in an NR V2X sidelink.

According to the present disclosure, there may be provided a method and apparatus for preventing a collision of feedback information transmitted in an NR V2X sidelink.

According to the present disclosure, there may be provided a method and apparatus for performing a PSFCH transmission in a single slot in response to a single Physical Sidelink Shared Channel (PSSCH) in an NR V2X sidelink.

According to the present disclosure, there may be provided a method and apparatus for performing a PSFCH transmission in a single slot in response to at least one PSSCH in at least one slot in an NR V2X sidelink.

Effects achievable from the present disclosure are not limited to the aforementioned effects and still other effects not described herein may be clearly understood by one of ordinary skill in the art to which the present disclosure pertains from the following description.

BRIEF DESCRIPTION OF DRAWINGS

FIG. 8 illustrates a method of determining a frequency resource of a PSFCH based on a PSCCH according to an example of the present disclosure.

FIG. 11 illustrates a method of performing Hybrid Automatic Repeat and Request (HARQ) feedback according to an example of the present disclosure.

FIGS. 13A and 13B illustrate a resource allocation method of a PSFCH considering PSSCH transmissions having the same subchannel index and different slot indices, and FIGS. 13C and 13D illustrate a PSFCH transmission method for PSSCH transmissions having higher priority.

FIGS. 16A, 16B, 16C and 16D illustrate a method of transmitting a PSFCH in response to receiving a plurality of PSSCHs in a single unicast/groupcast.

DETAILED DESCRIPTION

Figure 1:
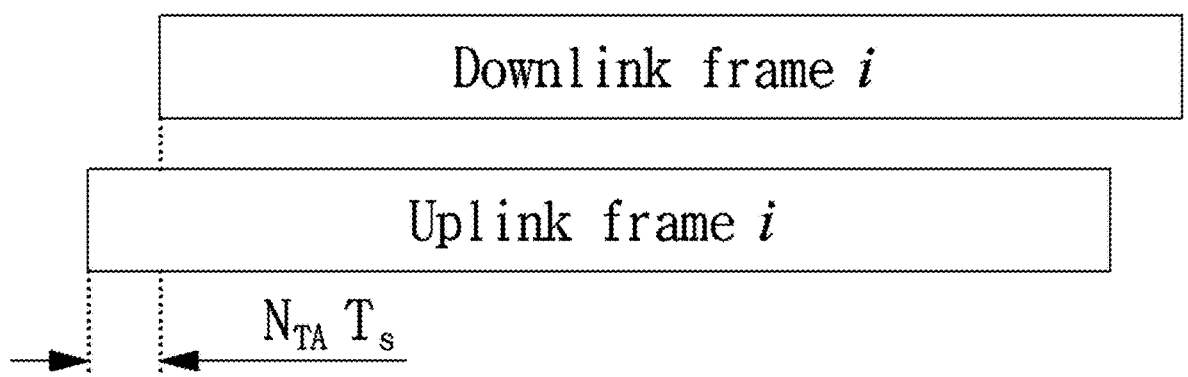
FIG. 1 illustrates a frame structure for downlink/uplink transmission according to the present disclosure.

The present disclosure may provide a method of performing, by a user equipment (UE), a Hybrid Automatic Repeat and Request (HARQ) feedback procedure in a new radio (NR) vehicle-to-everything (V2X) system. Here, the method of performing, by the UE, the HARQ feedback procedure may include receiving sidelink data from a transmitting (Tx) UE and transmitting feedback information about the received sidelink data to the Tx UE through a Physical Sidelink Feedback Channel (PSFCH). Here, a time resource of the PSFCH may be determined based on a slot in which sidelink data is received and a frequency resource of the PSFCH may be determined based on at least one of a frequency resource of a Physical Sidelink Control Channel (PSCCH) and a frequency resource of a Sidelink Shared Channel (PSSCH) in which sidelink data is received.

The present disclosure may provide a method of performing, by a UE, an HARQ feedback procedure in an NR V2X system. Here, the method of performing, by the UE, the HARQ feedback procedure in the NR V2X system may include receiving sidelink (SL) data from a Tx UE, determining a PSFCH resource including feedback information about the received sidelink data, and transmitting a PSFCH to the Tx UE through the determined PSFCH resource. Here, the SL data may be transmitted based on a subchannel, and a Physical Resource Block (PRB) index of the PSFCH transmission including HARQ-ACK feedback transmission corresponding to an SL data channel (i.e., PSSCH) may be determined based on at least one of a PSFCH format type (e.g., a 1 PRB PSFCH format or a PSFCH format allocated to 1 PRB or more), a cast type (e.g., unicast or groupcast), an SL physical layer ID, a PRB offset, a subchannel index, a logical or physical slot index, an HARQ association set, the number of code resources per PRB, whether to apply frequency hopping, whether to configure a slot aggregation for PSSCH transmission, whether to apply SL HARQ-ACK bundling, the number of SL HARQ-ACK information bits (e.g., ≤2 or >2), and the number of resource blocks per subchannel.

Various examples of the disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

In describing the examples, detailed description on known configurations or functions may be omitted for clarity and conciseness. Throughout the drawings and the detailed description, unless otherwise described, the same drawing reference numerals are understood to refer to the same elements, features, and structures.

It will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Further, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the disclosure.

Herein, elements described in various examples may not be necessarily essential and may be partially selectable. Therefore, an example including a partial set of elements described in an example is also included in the scope of the disclosure. Also, an example that additionally includes another element to elements described in various examples is also included in the scope of the disclosure.

Further, the description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

That is, it is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto. Also, the term "NR system" used herein is used as an example of a wireless communication system capable of supporting various subcarrier spacings (SCSs). However, the term "NR system" itself is not limited to the wireless communication system that supports the plurality of SCSs.

FIG. 1 illustrates an NR frame structure and a numerology according to an example of the present disclosure.

In NR, a basic unit of a time domain may be $$T_c = \frac{1}{\Delta f_{max} \cdot N_f}.$$

Here, $\Delta f_{max} = 480 \cdot 10^3$ and $N_f = 4096$. Also, $$K = \frac{T_s}{T_c} = 64$$

may be a constant about a multiple relationship between an NR time unit and an LTE time unit. In LTE, $$T_s = \frac{1}{\Delta f_{ref} \cdot N_{f,ref}}, \Delta f_{ref} = 15 \cdot 10^3 HZ,$$

and $N_{f,ref} = 2048$ may be defined as a reference time unit.

Frame Structure

Referring to FIG. 1, a time structure of a frame for a downlink/uplink (DL/UL) transmission may include $$T_f = \left(\frac{\Delta f_{max} N_f}{100}\right) \cdot T_s = 10ms.$$

Here, a single frame may comprise 10 subframes corresponding to $$T_{sf} = \left(\frac{\Delta f_{max} N_f}{1000}\right) \cdot T_s = 1ms.$$

The number of consecutive orthogonal frequency division multiplexing (OFDM) symbols per subframe may be $N_{symb}^{subframe,\mu} = N_{symb}^{slot} N_{slot}^{subframe,\mu}$. Also, each frame may be divided into two half frames and the half frames may comprise 0~4 subframes and 5~9 subframes. Here, half frame 1 may comprise 0~4 subframes and half frame 2 may comprise 5~9 subframes.

Here, a transmission timing of uplink transmission frame i is determined based on a downlink reception timing at a UE according to the following Equation 1.

In Equation 1, $N_{TA,offset}$ denotes a TA offset value occurring due to a duplex mode difference and the like. Basically, in a frequency division duplex (FDD), $N_{TA,offset} = 0$. In a time division duplex (TDD), $N_{TA,offset}$ may be defined as a fixed value by considering a margin for a DL-UL switching time.

$$N_{TA} = (N_{TA} + N_{TA,offset})T_c \quad \text{[Equation 1]}$$

Figure 2:
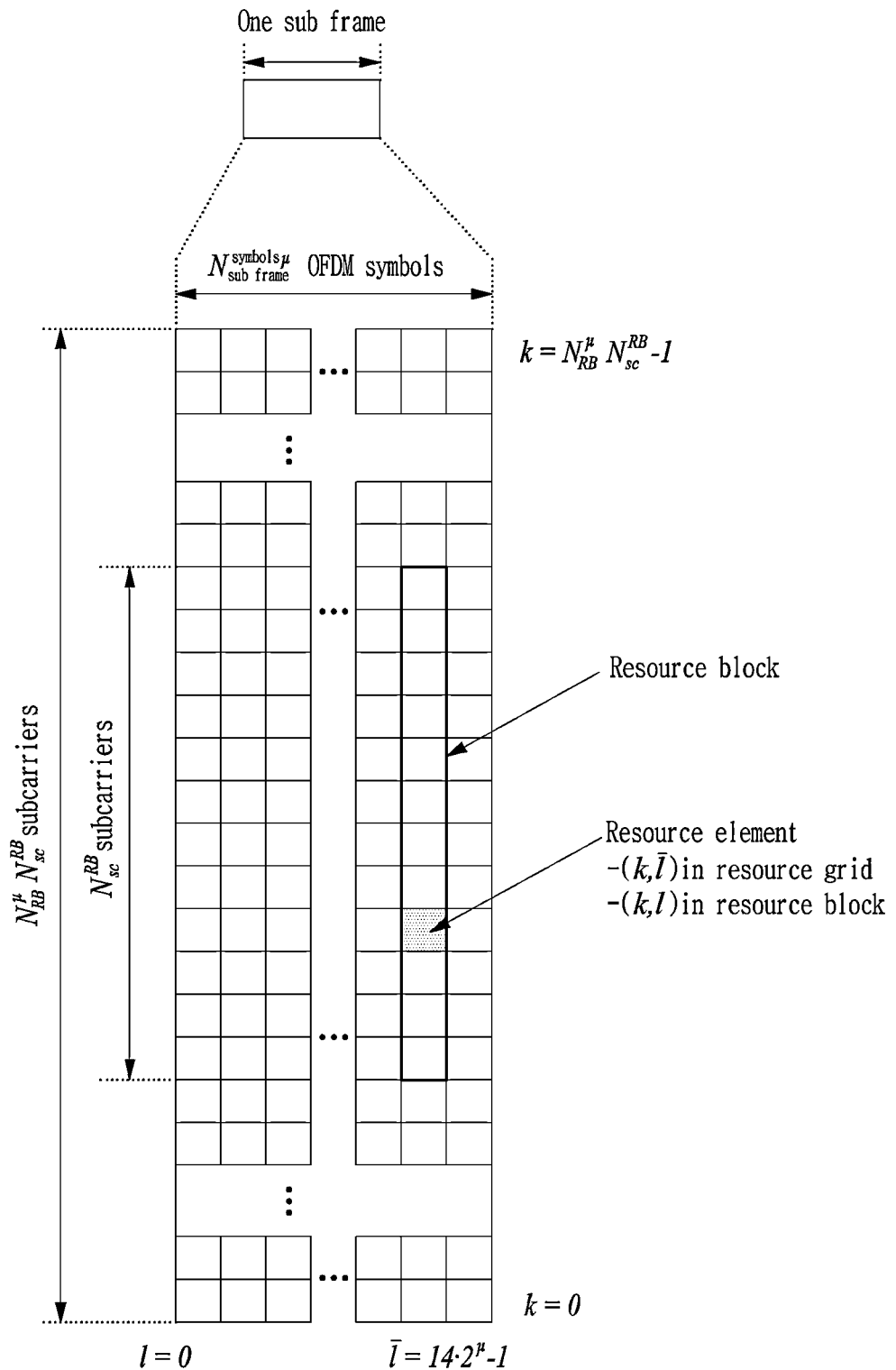
FIG. 2 illustrates a resource grid and a resource block according to the present disclosure.

FIG. 2 illustrates a resource grid and a resource block.

Referring to FIG. 2, a resource element within a resource grid may be indexed based on each subcarrier spacing. Here, a single resource grid may be generated for each antenna port and for each subcarrier spacing. Uplink/downlink transmission and reception may be performed based on a corresponding resource grid.

A single resource block may be configured on a frequency domain using 12 resource elements and may configure an index($n_{PRB}$) for a single resource block every 12 resource elements as represented by the following Equation 2. An index of the resource block may be used in a specific frequency band or system bandwidth.

$$n_{PRB} = \left\lfloor \frac{k}{N_{sc}^{RB}} \right\rfloor \quad \text{[Equation 2]}$$

Numerologies

Numerologies may be variously configured to meet various services and requirements of the NR system. Also, referring to the following Table 1, the numerologies may be defined based on an SCS, a cyclic prefix (CP) length, and the number of OFDM symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

Also, for example, referring to the following Table 1, if μ=2 and SCS=60 kHz, a normal CP and an extended CP may be applied. In other bands, only the normal CP may be applied.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having the number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, the number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to μ=1 and 2 may be used in the unlicensed band of 6 GHz or less and an SCS corresponding to μ=3 and 4 may be used in the unlicensed band above 6 GHZ. Here, for example, if μ=4, it may be used only exclusive for a synchronization signal block (SSB), which is described below. However, it is provided as an example only and the present disclosure is not limited thereto.

Also, Table 2 shows the number $N_{slot}^{symb,\mu}$ of OFDM symbols per slot for each SCS slot setting (μ). Table 2 shows the number of OFDM symbols per slot, a number of slots per frame, and a number of slots per subframe according to each SCS value (μ), as provided by Table 1. Here, in Table 2, the values are based on the normal slot having 14 OFDM symbols.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Also, as described above, if μ=2 and SCS=60 kHz, the extended CP may be applied. In Table 3, in the case of the extended CP, each value may be indicated based on the normal slot of which the number of OFDM symbols per slot $N_{slot}^{symb,\mu}$ is 12. Here, Table 3 shows the number of symbols per slot, the number of slots per frame, and the number of slots per subframe in the case of the extended CP that follows the SCS of 60 KHz.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Hereinafter, a structure of an SSB/Physical Broadcast Channel (PBCH) in the NR system and an initial cell access structure in the NR system are described.

Here, an NR base station (i.e., gNB) may periodically transmit signals and channels as shown in the following Table 4 to allow an initial cell selection of UEs in a cell.

TABLE 4

| SS/PBCH block (i.e. SSB |
| SIB1(System Information Block 1) |
| Other SIBs |

For example, the SS/PBCH block may be the aforementioned SSB. Here, even in the NR system, a UE may need to receive a broadcast channel for forwarding a synchronization signal and important system information transmitted from a corresponding wireless access system to perform an initial wireless access. To this end, the UE may check receiving sensitivity of a synchronization signal to discover an optical cell present in a most excellent channel environment. The UE may perform a frequency/time synchronization and cell identification operation for performing an initial access to an optimal channel among one or more channels in a specific frequency band operated based on the checked receiving sensitivity. The UE may verify a boundary of OFDM symbol timing through the aforementioned operation and then may initiate a PBCH demodulation in the same SSB.

Here, the UE may receive a PBCH demodulation reference signal (DMRS) and may perform a PBCH demodulation. Also, the UE may acquire 3-least significant bit (LSB) information from SSB index information bits through the PBCH DMRS. The UE may acquire information included in a PBCH payload by performing the PBCH demodulation. The UE may perform a procedure of demodulating SIB 1 based on the information acquired through the PBCH.

For example, in the NR system, the UE may receive remaining system information (RMSI) through a broadcast signal or channel as system information not transmitted from the PBCH. Also, the UE may receive other system information (OSI) and a paging channel through a broadcast signal or channel as other additional system information.

The UE may access a base station through a random access channel (RACH) process and then perform a mobility management.

Also, for example, when the UE receives an SSB, the UE needs to set an SSB composition and an SS burst set composition.

NR V2X Service

In association with a V2X service, the existing V2X service (e.g., LTE Rel-14 V2x) may support a set of basic requirements for V2X services. Here, the requirements are designed basically in sufficient consideration of a road safety service. Therefore, V2X UEs may exchange autonomous status information through a sidelink and may exchange the information with infrastructure nodes and/or pedestrians.

Meanwhile, in a further evolved service (e.g., LTE Rel-15) as the V2X service, new features are introduced by considering a carrier aggregation in a sidelink, a high order modulation, a latency reduction, a transmit (Tx) diversity, and feasibility for sTTI. Coexistence with V2X UEs (the same resource pool) is required based on the aforementioned description, and the services are provided based on LTE.

For example, technical features may be classified largely based on four categories as represented by the following Table 5 by considering use cases for supporting a new V2X service provided by system aspect (SA) 1. Here, in Table 5, "Vehicles Platooning" may be technology that enables a plurality of vehicles to dynamically form a group and similarly operate. Also, "Extended Sensors" may be technology that enables exchange of data gathered from sensors or video images. Also, "Advanced Driving" may be technology that enables a vehicle to drive based on semi-automation or full-automation. Also, "Remote Driving" may be technology for remotely controlling a vehicle and technology for providing an application. Based thereon, further description related thereto may be given by the following Table 5.

TABLE 5

Vehicles Platooning

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.
Extended Sensor Extended Sensor enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of key characteristics.
Advanced Driving Advanced Driving enables semi-automated or full-automated driving. Each vehicle and/or RSU shares its own perception data obtained from its local TABLE 5-continued sensors with vehicles in proximity and that allows vehicles to synchronize and coordinate their trajectories or maneuvers. Each vehicle shares its driving intention with vehicles in proximity too.
Remote Driving Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Also, the above SAI may consider all of LTE and NR for enhanced V2X (eV2X) support technology for supporting the new V2X service. For example, an NR V2X system may be a first V2X system. Also, an LTE V2X system may be a second V2X system. That is, the NR V2X system and the LTE V2X system may be different V2X systems. In the following, description is made based on a method of satisfying low latency and high reliability required in an NR sidelink based on the NR V2X system. Here, even in the LTE V2X system, the same or similar composition may be expanded and thereby apply. However, it is provided as an example only and the present disclosure is not limited thereto. That is, even in the LTE V2X system, the present disclosure may apply to an interactable portion and is not limited to the following example. Here, for example, NR V2X capability may not be limited to essentially support only V2X services and V2X RaT to be used may be selected.

NR Sidelink

The NR sidelink may be used for the aforementioned NR V2X service. Here, for example, an NR sidelink frequency may consider FR1 that is a frequency of 6 GHz or less and FR2 (i.e., up to 52.6 GHz) that is a frequency over 6 GHz. Also, for example, the NR sidelink frequency may consider all of unlicensed ITS bands and licensed bands. That is, as described above, a common design method may be required to support each frequency band. To this end, an NR sidelink design considering an NR system may be required. For example, similar to an NR standard design, the NR sidelink design capable of basically supporting beam-based transmission and reception may be required even in an omni-directional Tx/Rx case not a beam-based case. However, it is provided as an example only.

Also, for example, a physical channel for an NR V2X sidelink may be set. For example, an NR Physical Sidelink Shared Channel (PSSCH) may be a data channel for NR sidelink as a physical channel. Also, for example, an NR Physical Sidelink Control Channel (PSCCH) may be a control channel for NR sidelink as a physical channel. Here, scheduling information for the data channel of the NR sidelink and other control information may be forwarded through the NR PSCCH. For example, Sidelink Control Information (SCI) refers to a format that defines fields about control information associated with scheduling of the NR sidelink data channel and control information transmitted through the NR PSCCH may be transmitted based on an SCI format.

Also, for example, an NR Physical Sidelink Feedback Channel (PSFCH) may be defined. Here, the NR PSFCH may be an NR HARQ feedback channel as a physical channel. Here, HARQ-ACK feedback information corresponding to the NR sidelink data channel, Channel Status Information (CSI), and other information may be forwarded through the NR PSFCH. In detail, Sidelink Feedback Control Information (SFCI) including feedback information may be forwarded through the NR PSFCH. Here, the SFCI may include at least one of HARQ-ACK, Channel Quality Information (CQI), Precoding Matrix Indicator (PMI), Rank Indicator (RI), Reference Signal Received Power (RSRP), Reference Signal Received Quality (RSRQ), path gain/pathloss, Scheduling Request Indicator (SRI), Contention Resolution Identity (CRI), interference condition, and vehicle motion information. However, it is provided as an example only and the present disclosure is not limited thereto.

Also, for example, an NR Sidelink Synchronization Signal (SLSS)/Physical Sidelink Broadcast Channel (PSBCH) block may be defined as a synchronization and broadcast channel block in which an NR SL synchronization signal and a SL broadcast channel are transmitted on a single continuous time in a physical layer. Here, to support a beam-based transmission on an NR frequency band, the NR SLSS/PSBCH block may be periodically transmitted based on a set of one or more block indices. Also, a synchronization signal may include a Primary Sidelink Synchronization Signal (PSSS) and a Secondary Sidelink Synchronization Signal (SSSS) and a sequence for a corresponding signal may be generated based on at least one SLSSID value. Here, a PSBCH may be transmitted with an SLSS to forward system information required to perform V2X SL communication. For example, as described above, the SLSS/PSBCH block may be periodically transmitted in a form of a set of SLSS/PSBCH block indices to support beam-based transmission.

Also, the following Table 6 shows terms applied herein. However, it is provided as an example only and the present disclosure is not limited thereto.

TABLE 6

UMTS (Universal Mobile Telecommunications System):

refers to 3rd Generation (3G) mobile communication technology based on Global System for Mobile Communication (GSM), developed by 3GPP.

EPS (Evolved Packet System):

refers to a network system that includes an Evolved Packet Core (EPC) that is a packet switched (PS) core network based on an Internet protocol (IP) and an access network such as LTE/Universal Terrestrial Radio Access Network (UTRAN). A network evolved from Universal Mobile Telephone System (UMTS).

NodeB:

refers to a base station of GERAN/UTRAN and is installed outdoors and has coverage of macro cell scale.

eNodeB:

refers to a base station of E-UTRAN and is installed outdoors and has coverage of macro cell scale.

gNodeB:

refers to a base station of NR and is installed outdoors and has coverage of macro cell scale.

UE (User Equipment):

refers to a user equipment.
The UE may also be interchangeably used with terms,
terminal, mobile equipment (ME), mobile station (MS), and the like. Also, the UE may be a portable device, such as a laptop computer, a mobile phone, a personal digital assistant (PDA), a smartphone, and a multimedia device, or may be an unportable device, such as a personal computer (PC) and a vehicle mounted device. The term "UE" or "terminal" in Machine Type Communications (MTC) related content may refer to an MTC device.

RAN (Radio Access Network):

refers to a unit that includes NodeB, eNodeB, and gNodeB, and a radio network controller (RNC) for controlling the same in a 3GPP network, and is present between UEs and provides a connectivity to a core network.

NG-RAN (Next Generation Radio Access Network):

refers to NG-eNB (E-UTRA UP/CP protocol) and gNB (NR UP/CP protocol) base station nodes connected to 5GC (5G Core NW) based on an NG interface in a 3GPP network.

Xn interface:

refers to an interface for interconnection between NG-eNB and gNB.

PLMN (Public Land Mobile Network):

refers to a network configured to provide a mobile communication service to individuals, and may be configured for each operator.

Proximity service (or ProSe Service or Proximity based Service):

refers to a service that enables discovery and direct communication between physically proximate apparatuses, communication through a base station, or communication through a third apparatus.
Here, user plane data is exchanged
through a direct data path without going through a 3GPP core network (e.g., EPC).

NR Sidelink Design

Hereinafter, an NR V2X sidelink design method to meet the requirements for the aforementioned evolved V2X (i.e., eV2X) services is described.

In detail, a synchronization procedure and method required to form a radio link for an NR sidelink is described. For example, as described above, in the NR sidelink design, all of FR1 and FR2 (i.e., up to 52.6 GHz), unlicensed ITS bands and licensed bands ITS, and frequency bands and range operated by the NR system may be considered as an NR sidelink frequency. Also, for example, the availability of LTE (NG-eNB)/NR Uu link that is the 3GPP NG-RAN of Table 6 may be considered in the NR sidelink design.

Also, for example, a design for eV2X synchronization information transmission and signal transmission and reception to meet higher requirements from the aforementioned evolved V2X services may be considered. Here, a frequency for NR V2X sidelink communication may further consider at least one of elements shown in the following Table 7 based on technologies required by the new system, which differs from the existing system (e.g., LTE). That is, there is a need to meet the new V2X service requirements by applying NR V2X sidelink based on NR radio access technology, particularly, uplink transmission related technologies.

Also, other elements may be considered by considering a new system as well as the following Table 7. However, it is provided as an example only and the present disclosure is not limited thereto.

TABLE 7

Scalable frequency use and configuration based on broadband frequency band and maximum bandwidth capability of UE (e.g., bandwidth part [BWP])
Various numerologies (e.g., variable SCSs, number of OFDM symbols per slot
(or subframe
Slot format (slot/non-slot)
Beam-based transmission and reception to cope with signal attenuation in a frequency band of 6 GHz or more corresponding to a high frequency band
Configured grant-based uplink transmission and reception for providing lower
latency Also, for example, as described above, a physical channel, a signal, a basic slot structure, and physical resources of the NR V2X sidelink may be represented as the following Table 8.

TABLE 8

NR PSSCH (Physical Sidelink Shared Channel)
A physical layer NR SL data channel
NR PSCCH (Physical Sidelink Control Channel)
As a physical layer NR SL control channel, a channel for forwarding control information as well as scheduling information of an NR SL data channel
NR SLSS/PSBCH (Sidelink Synchronization Signal/Physical Sidelink Broadcast Channel) block
A synchronization and broadcast channel block in which an NR SL synchronization signal and a broadcast channel are transmitted on a single continuous time in a physical layer. Periodically transmitted based on a set of one or more block indices to support a beam-based transmission on an NR frequency band. A synchronization signal includes a PSSS and an SSSS and a sequence for a corresponding signal is generated based on at least one SLSSID value. A PSBCH is transmitted with an SLSS to forward system information required to perform V2X SL communication. As described above, periodically transmitted in a form of a set of SLSS/PSBCH block indices to support beam-based transmission.

Figure 3:
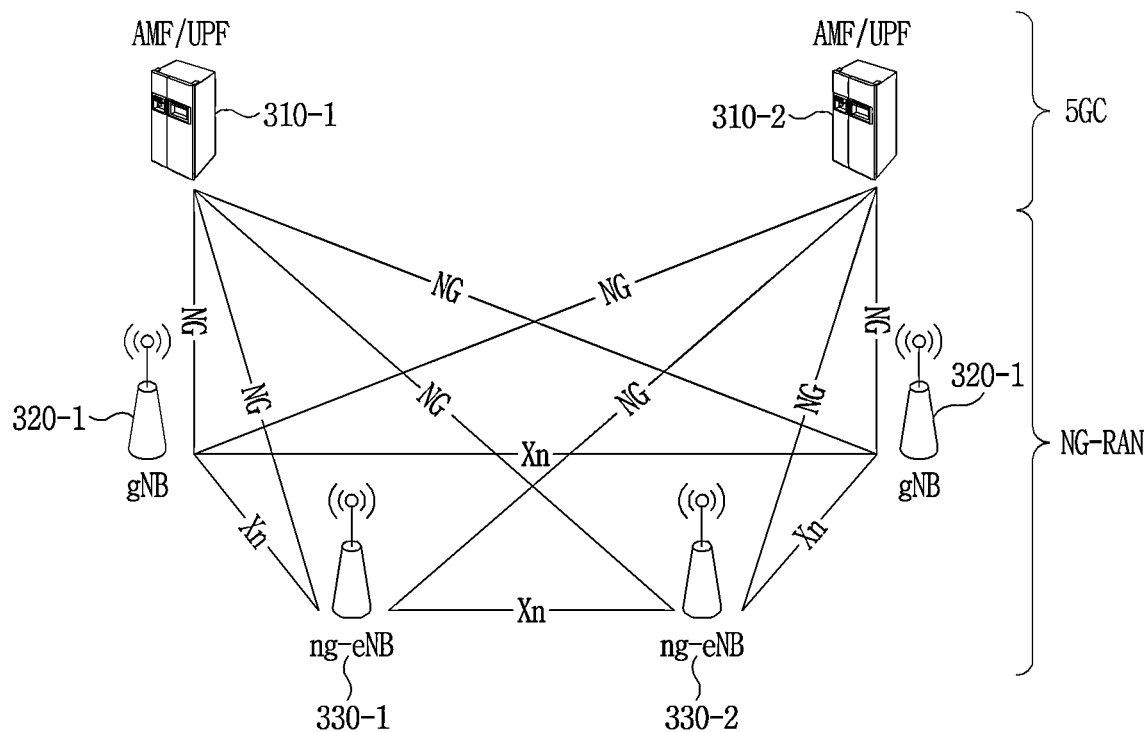
FIG. 3 illustrates a system architecture according to an example of the present disclosure.

Also, for example, FIG. 3 illustrates a basic network architecture configuration considering an NR V2X sidelink.

For example, referring to FIG. 3, NG interfaces may be set between nodes 310-1 and 310-2 of a 5-th generation core (5GC NW) and nodes 320-1, 320-2, 330-1, and 330-2 of an NG-RAN. Also, Xn interfaces may be set between the nodes 320-1, 320-2, 330-1, and 330-2 of the NG-RAN. Here, in the above architecture, corresponding nodes may be interconnected through the corresponding Xn interface based on gNB (NR UP/CP protocol) corresponding to the nodes 320-1 and 320-2 and NG-eNB (E-UTRA UP/CP protocol) corresponding to the nodes 330-1 and 330-2, which constitute the NG-RAN. Also, as described above, in the 5GC, corresponding nodes may be interconnected through a corresponding NG interface. Here, for example, in the above architecture, all of an LTE sidelink UE and an NR sidelink UE may be controlled by the NG-RAN (i.e., LTE Uu and NR Uu) based on gNB and NG-eNB. Therefore, when transmitting synchronization information, the NR sidelink UE may receive synchronization information from the LTE Uu or NR Uu link, and may transmit NR sidelink synchronization information (e.g., SL synchronization signal/SL Physical Broadcast Channel (PBCH)) based on the received synchronization information. However, it is provided as an example only and the present disclosure is not limited thereto. That is, the NR sidelink UE may also acquire the synchronization information through the LTE Uu link as well as the NR Uu link.

Meanwhile, with respect to V2X sidelink communication, V2X sidelink UEs may perform the V2X sidelink communication. Here, predetermined conditions need to be met such that the V2X sidelink UEs may start the communication. The conditions may be represented by the following Table 9. That is, a V2X sidelink UE may perform V2X sidelink communication in an RRC idle mode, inactive mode, or connected mode. Also, V2X sidelink UEs that perform the V2X sidelink communication need to be registered on a selected cell on a using frequency or need to belong to the same PLMN. Also, if a V2X sidelink UE is an OOC on a frequency for V2X sidelink communication, the V2X sidelink UE may perform the V2X sidelink communication only when it is possible to perform the V2X sidelink communication based on pre-configuration.

TABLE 9

If a UE is in an RRC_IDLE or INACTIVE or CONNECTED mode in a specific cell,
If a UE is registered to a selected cell on a frequency used for V2X SL communication or belongs to the same PLMN,
If a UE is an OCC on a frequency for a V2X SL communication operation, and if a UE is capable of performing V2X SL communication based on pre-configuration Here, as described above, to start the V2X sidelink communication, sidelink synchronization information may be required. Therefore, the UE needs to transmit the sidelink synchronization information. Here, a Tx UE (sidelink Tx UE) may receive a configuration for transmitting sidelink synchronization information prior to transmitting corresponding synchronization information. Here, for example, the Tx UE may receive the configuration for transmitting the sidelink synchronization information based on a system information message or an RRC reconfiguration message (in the case of an RRC CONNECTED UE) broadcasted from the above NG-RAN nodes. Also, for example, if an NR V2X sidelink UE (hereinafter, referred to as a UE) is absent in an NG-RAN, the UE may transmit sidelink synchronization information based on the pre-configured information, which is described above.

Figure 4:
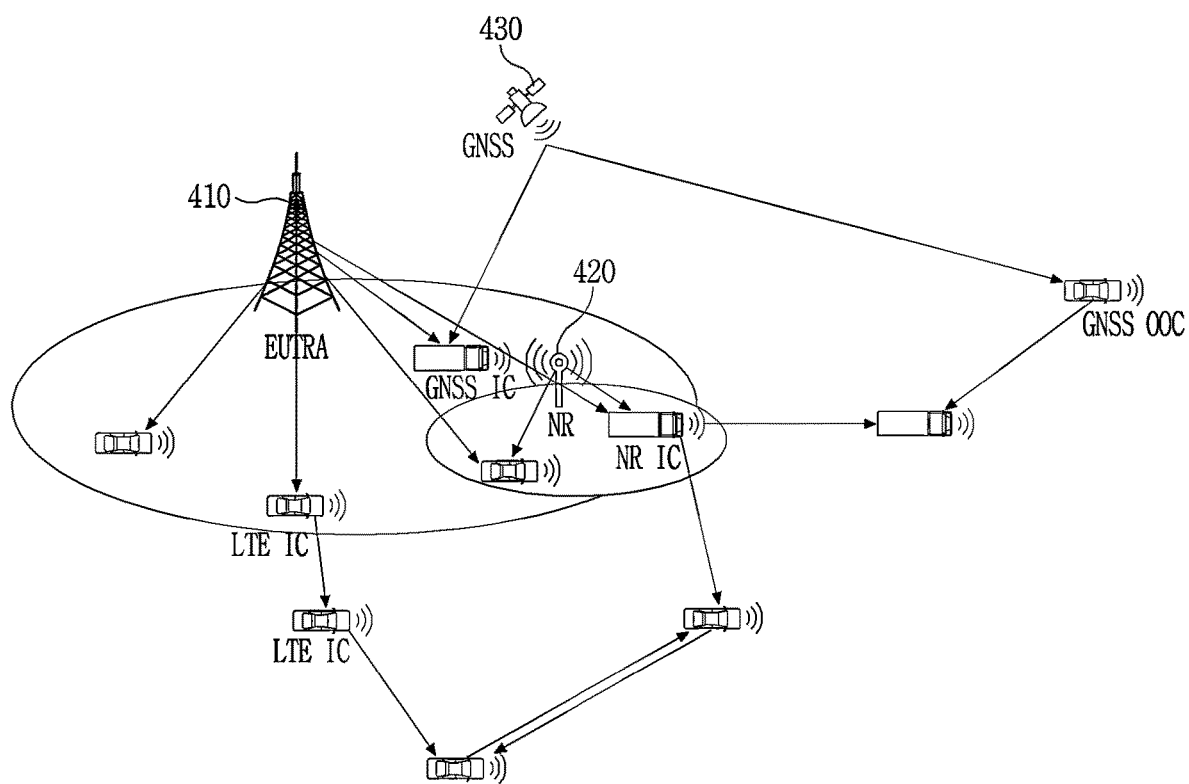
FIG. 4 illustrates a scenario in which new radio (NR) vehicle-to-everything (V2X) sidelink communication is performed in a 3rd Generation Partnership Project (3GPP) network according to an example of the present disclosure.

Meanwhile, FIG. 4 illustrates an example of a scenario in which NR V2X sidelink communication is performed in a 3GPP network based on the aforementioned description. Here, the NR V2X sidelink communication may be performed on the 3GPP network (hereinafter, NG-RAN). Additionally, presence of a Global Navigation Satellite System (GNSS) signal may be considered.

In detail, referring to FIG. 4, each of NR V2X sidelink UEs may be an IC or an OOC in EUTRA NG-eNB 410 perspective, may also be an IC or an OOC in gNB 420 perspective, and may also be an IC or an OOC in GNSS 430 perspective. Here, by considering the aforementioned situation, NR V2X sidelink UEs may select a source of synchronization reference based on a location and capability of a UE. Also, for example, in addition to the scenario of FIG. 6, scenarios shown in the following Table 10 may be considered. However, it is provided as an example only and the present disclosure is not limited thereto.

TABLE 10

NR Uu Connected/IDLE/Inactive for NR Sidelink
NG-eNB Uu Connected/IDLE for NR Sidelink
EN-DC or MR-DC for NR Sidelink Meanwhile, in the following, an NR SCS may be one of an SCS value for NR DL SS/PBCH, an SCS value for NR BWP (data/control channel), and a reference SCS value defined/set for comparison between NR V2X SCS values. As another example, the NR SCS may be one of an SCS value for NR V2X SLSS/PSBCH, an SCS value for NR V2X BWP or resource pool (data/control channel), and a reference SCS value defined/set for comparison between NR V2X SCS values. However, it is provided as an example only. Also, for example, 30 kHz SCS value may be set as a default value and thereby used for 5.9 GHZ ITS spectrum. However, it is provided as an example only and the present disclosure is not limited thereto.

In the case of performing NR V2X sidelink communication, a data transmission may be performed based on unicast/groupcast. Here, for example, a unicast transmission may represent that a single UE transmits a message to another single UE, that is, may represent a one-to-one transmission. Also, a broadcast transmission may refer to a scheme of transmitting a message to all of UEs regardless of whether a receiving (Rx) UE supports a service. That is, in the broadcast transmission, a single UE may transmit a message to a plurality of Rx UEs regardless of whether the plurality of Rx UEs supports a service. Meanwhile, a groupcast transmission scheme may refer to a scheme of transmitting a message to a plurality of UEs belonging to a group.

Here, for example, activation and session connection for transmission and reception of unicast, groupcast or broadcast data may be determined in an upper layer. That is, in a physical layer of a V2X sidelink UE (hereinafter, V2X SL UE), operation may be performed based on an instruction determined in the upper layer. However, it is provided as an example only.

Also, for example, the V2X SL UE may perform corresponding transmission and reception after a session for corresponding unicast or groupcast data transmission is established. When the V2X SL UE performs the transmission and reception based on the aforementioned session, a physical layer of the V2X SL UE may be aware in advance of physical layer parameter information for data transmission corresponding to unicast or groupcast. For example, the V2X SL UE may receive, from a base station, and recognize in advance the above information. As another example, the aforementioned information may be information preset to the V2X SL UE. Here, for example, corresponding parameter information may include at least one ID value as shown in the following Table 11. In detail, destination group ID and source ID information may be included in the parameter information in association with groupcast. Also, a destination ID and a source ID may be included in the parameter information in association with unicast. As another example, an HARQ process ID may be included in the parameter information, which is further described below.

TABLE 11

NR V2X Physical layer IDs:

Groupcast: destination group ID, source ID
Unicast: destination ID, source ID
HARQ process ID Here, for example, unicast or multicast data transmission and reception may apply when a small number of V2X SL UEs are present around a Tx V2X SL UE and a session is stably maintained. In addition, when the session is unstable or when many changes occur in neighboring V2X SL UEs, data transmission may be performed generally based on broadcast transmission. However, it is provided as an example only and the present disclosure is not limited thereto.

Also, for example, as described above, unicast or groupcast transmission and reception may be determined at an application layer end as an upper layer. Here, for example, data generated in the application layer and allocatable to transmission and reception may not be directly mapped to a radio layer. Here, for example, the aforementioned unicast or groupcast transmission and reception may require a predetermined mapping relationship or connection establishment procedure to perform data transmission and reception on the radio layer. However, it is provided as an example only and the present disclosure is not limited thereto.

Also, for example, the unicast data transmission and reception requires establishment of a session by performing a procedure (e.g., discovery procedure) of discovering presence of corresponding Tx and Rx UEs and the session may be established using various methods. Here, a session establishment between UEs may be performed with assistance of a base station. The base station may collect location information of UEs and may determine whether UEs capable of performing unicast or groupcast data transmission and reception are adjacent to each other. Here, for example, the base station may determine whether UEs are adjacent to each other based on a threshold and determination for the threshold may be a random value. When it is determined that UEs in a cell are adjacent to each other, the base station may initialize a corresponding discovery procedure and the UEs may perform the corresponding discovery procedure to discover each other based on an initialization procedure. Also, the base station may determine whether an adjacent V2X SL UE is present by designing a new discovery channel and by periodically transmitting and receiving the corresponding channel. Also, the base station may determine whether an adjacent UE is present by transmitting and receiving a corresponding discovery message through a V2X data channel. However, it is provided as an example only and the present disclosure is not limited thereto.

That is, a session establishment for unicast or groupcast data transmission and reception may be completed based on the aforementioned procedures.

Next, the upper layer may notify the physical layer of information about the session establishment and may perform a physical layer operation, such as HARQ-ACK, CSI and link adaptation.

Hereinafter, a case of using a PSFCH for forwarding HARQ-ACK feedback among the aforementioned operations is described.

Also, for example, related content is described based on the PSFCH as a channel for transmitting feedback information. Here, for example, the PSFCH (feedback channel) for forwarding the feedback information may be defined as a new physical channel and may be defined as a feedback channel for transmitting feedback information by reusing a processing channel about an existing control channel (e.g., PSCCH). That is, the feedback information may be transmitted through a newly defined channel (e.g., PSFCH) or may be transmitted through a channel that maximally reuses the existing control channel.

For clarity of description, the following description is made based on the term "PSFCH." Therefore, in the following example, "transmitted through PSFCH" may be replaced with "feedback information is included in a corresponding physical channel and thereby transmitted by reusing the existing control channel instead of defining a new physical channel." Also, for example, a portion of feedback information may be transmitted through the PSFCH and a portion of feedback information may be included in the control channel and thereby transmitted. However, it is provided as an example only and the present disclosure is not limited thereto. Here, for clarity of description, the following description is made based on the PSFCH.

Here, the PSFCH may require a physical resource selection method as a channel for transmitting at least HARQ-ACK feedback. In detail, as described above, in the case of operating based on unicast or multicast not based on broadcast, there is a need to forward HARQ feedback information. Also, in addition to the HARQ feedback information, information, such as, for example, Channel State Information (CSI) feedback information, beam-related information (CSI-RS resource indicator (CRI)/SRS resource indicator (SRI)), sidelink transmission power control information, RSRP, RSRQ, pathgain/pathloss, interference condition, and vehicle motion may be forwarded through the PSFCH. Here, although the present disclosure describes an operation of a UE when forwarding HARQ feedback information for unicast and groupcast data transmission and reception, it is provided as an example only. Here, the aforementioned PSFCH may be used to forward HARQ feedback information. A time/frequency resource determination method about the PSFCH may be required.

Here, for example, when the V2X SL UE performs an HARQ feedback transmission for received data, the V2X SL UE needs to determine a physical resource of a physical channel that transmits the corresponding HARQ feedback information. Here, the physical resource may be a time resource, a frequency resource, and additionally a code resource based on a PSFCH design. However, it is provided as an example only. Hereinafter, a method of determining the time resource and the frequency resource as the physical resource is further described.

Here, for example, the time resource in the physical resource may be determined based on the following Table 12. In detail, the time resource about the PSFCH may be determined based on a predetermined slot and an OFDM symbol index. For example, when the V2X SL UE receives data in an $n^{th}$ slot (slot n), the V2X SL UE may transmit the PSFCH in OFDM symbol(s) just before a last guard symbol in an $(n+1)^{th}$ slot (slot n+1) that is a subsequent slot of a slot in which data is received.

As another example, the time resource may be determined based on a slot set by the base station, an OFDM symbol, and an offset $\Delta_t$ value. For example, when the V2X SL UE receives data in the $n^{th}$ slot (slot n), the V2X SL UE may transmit the PSFCH in a slot n+$\Delta_t$. Here, for example, the aforementioned slot, OFDM symbol, and offset may be pre-configured based on a sidelink resource allocation mode of the UE (e.g., in the case of a UE resource allocation mode, not a base station resource allocation mode).

As another example, an offset $\Delta_t$ value corresponding to the slot and the OFDM symbol may be indicated through a Downlink Control Information (DCI) format transmitted from the base station and/or a Sidelink Control Information (SCI) format transmitted from the Tx UE. When the V2X SL UE receives data in the $n^{th}$ slot (slot n), the V2X SL UE may transmit the PSFCH in the slot n+$\Delta_t$.

That is, the time resource may be determined based on the following Table 12 as the aforementioned method. However, it is provided as an example only and the present disclosure is not limited thereto.

TABLE 12 predetermined slot/OFDM symbol index (e.g., if data is received in slot n, an OFDM symbol just before a last guard symbol in a subsequent slot n + 1 of the slot n), or
slot/OFDM symbol offset $\Delta_t$ value set by a base station/pre-configuration (e.g., if data is received in slot n, subsequent slot n + $\Delta_t$), or
slot/OFDM symbol offset $\Delta_t$ value through a DCI format transmitted from a base station and/or an SCI format transmitted from a Tx UE (e.g., if data is received in slot n, subsequent slot n + $\Delta_t$)

Also, for example, the frequency resource as well as the time resource may need to be determined. In the following example, a method of determining the frequency resource is described. Here, a combination of each time resource determination method of Table 12 and each frequency resource determination method in the following example may be used. That is, each time resource determination method of Table 12 and each frequency resource determination method may be individually combined. However, it is provided as an example only and the present disclosure is not limited thereto.

Example 1 (PSFCH Frequency Resource Determination Method)

Figure 5:
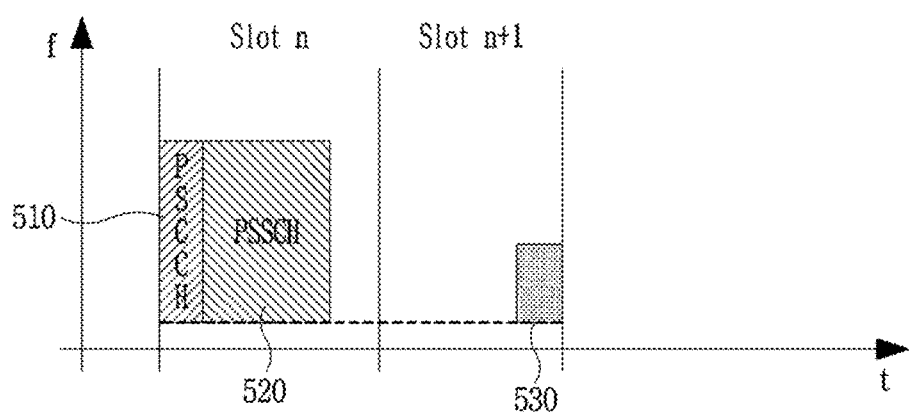
FIG. 5 illustrates a method of determining a frequency resource of a Physical Sidelink Feedback Channel (PSFCH) according to an example of the present disclosure.

FIG. 5 illustrates a method of determining a frequency resource of a PSFCH (also, referred to as PSFCH frequency resource).

For example, a frequency resource for performing a PSFCH transmission may be determined based on a PSCCH or a PSSCH. In detail, the frequency resource for performing the PSFCH transmission may be determined based on a "start PRB/subchannel index" in which the PSCCH or the PSSCH is received. For example, referring to FIG. 5, a lowest or start frequency resource of a PSFCH 530 may be determined based on subcarrier #0 with a lowest frequency PRB/subchannel in a physical resource to which a PSCCH 510 or a PSSCH 520 is allocated. Here, a V2X SL UE may perform transmission of the PSFCH 530 in a frequency resource corresponding to the number of frequency resource RBs/subchannels needed for the PSFCH 530 determined based on a start PRB/subchannel index in which the PSCCH 510 or the PSSCH 520 is received.

Here, for example, referring to FIG. 5, the start PRB/subchannel index in which the PSCCH 510 is received may be the same as that of the PSSCH 520. Therefore, a start point of the frequency resource of the PSFCH 530 may be determined based on the start PRB/subchannel index in which the PSCCH 510 or the PSSCH 520 is received.

For example, the start PRB/subchannel index of the PSCCH 510 may differ from that of the PSSCH 520. Here, if the start PRB/subchannel index of PSCCH 510 differs from that of the PSSCH 520, the start point of the frequency resource of the PSFCH 530 may be determined based on the start PRB/subchannel index in which the PSCCH 510 is received. As another example, if the start PRB/subchannel index of PSCCH 510 differs from that of the PSSCH 520, the start point of the frequency resource of the PSFCH 530 may be determined based on the start PRB/subchannel index in which the PSSCH 520 is received.

Also, for example, a resource used to determine the start point of the frequency resource of the PSFCH 530 may be pre-configured. Therefore, an Rx UE that receives sidelink data may determine the start point of the frequency resource of the PSFCH 530 without additional signaling based on the received sidelink data and pre-configured information. Here, the Rx V2X SL UE may perform the transmission of the PSFCH 530 in the frequency resource within the configured number of frequency resource RBs/subchannels for the PSFCH 530.

Here, the number of PSFCH frequency resource RBs/subchannels may be determined based on a PSFCH transmission format being used. For example, PSFCH transmission format 1 may use only a single Resource Block (RB). Also, for PSFCH transmission format 2, the number of RBs of the PSFCH transmission format 2 may be determined by a base station (or a resource allocation UE) or may be pre-configured. Here, the aforementioned predetermined number of RBs may be determined based on a size of Sidelink Feedback Control Information (SFCI). The SFCI may be feedback information transmitted through the PSFCH. Also, for example, an available PSFCH format may be determined based on a size of SFCI supported by the PSFCH format and the number of PRBs (i.e., determined based on the PSFCH format) used by the PSFCH format may be determined as the number of PRBs/subchannels for PSFCH transmission. However, it is provided as an example only and the present disclosure is not limited thereto.

As another example, the number of frequency resource RBs/subchannels for PSFCH may be determined through an RRC message. As another example, the number of frequency resource RBs/subchannels for PSFCH may be determined through pre-configuration. As another example, the number of frequency resource RBs/subchannels for PSFCH may be determined by a data Tx V2X SL UE. Here, the V2X SL Tx UE that is transmitting SL data may provide the number of frequency resource RBs/subchannels for PSFCH transmission to the V2X SL Rx UE by sending a PSCCH (SCI field) associated with unicast/groupcast data transmission (i.e., PSSCH).

Also, for example, the number of PSFCH frequency resource RBs/subchannels may be determined by the base station. Here, the base station may provide information about the determined number of PSFCH frequency resource RBs/subchannels to the data Tx V2X SL UE through a PDCCH (DCI). Here, the data Tx V2X SL UE may provide again information about the number of PSFCH frequency resource RBs/subchannels to the PSFCH Tx UE through a PSCCH (SCI field) associated with the PSFCH transmission. For example, as described above, if a resource allocation mode is performed by the base station, information about the number of PSFCH frequency resource RBs/subchannels may be determined by the base station and forwarded to the V2X SL UE. However, it is provided as an example only and the present disclosure is not limited thereto.

Also, for example, the number of PSFCH frequency resource RBs/subchannels may be provided through a PSCCH (SCI field) of a UE (or a UE assisting resource allocation) supporting a data resource allocation of the V2X SL UE that transmits the PSFCH.

Also, for example, the number of PSFCH frequency resource RBs/subchannels may be provided through a PSCCH (SCI field) of another UE performing a data resource allocation of the V2X SL UE that transmits the PSFCH. However, it is provided as an example only and the present disclosure is not limited thereto.

Figure 6:
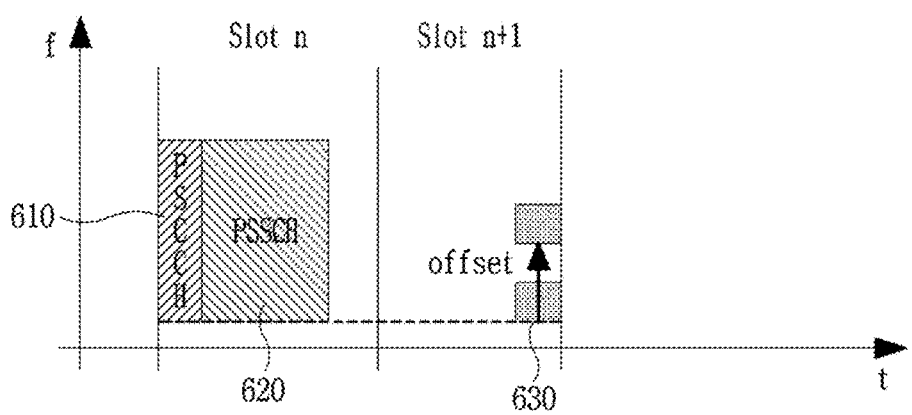
FIG. 6 illustrates a method of determining a frequency resource of a PSFCH based on offset information according to an example of the present disclosure.

As another example, FIG. 6 illustrates a method of determining a frequency resource of a PSFCH.

For example, the PSFCH frequency resource may be determined by using "start PRB/subchannel index" in which a PSCCH or a PSSCH is received+"PRB/subchannel offset $\Delta_f$ value" as a start point in frequency of resource allocation. Here, a PSFCH transmission may be performed in a frequency resource within a number of PSFCH frequency resource RBs/subchannels from the start point in frequency. Here, for example, the PRB/subchannel offset $\Delta_f$ value may be configured based on an RRC message. Also, for example, the PRB/subchannel offset $\Delta_f$ value may be a pre-configuration value. Also, for example, the PRB/subchannel offset $\Delta_f$ value may be configured between V2X SL UEs performing sidelink data transmission and reception through a unicast or multicast session establishment procedure. Here, the offset $\Delta_f$ value may be indicated based on a unit of the number of RBs or subchannels. However, it is provided as an example only and the present disclosure is not limited thereto.

Here, referring to FIG. 6, as described above, a frequency resource of a PSFCH 630 may be determined based on a start PRB/subchannel index in which a PSCCH 610 or a PSSCH 620 is received. Here, the frequency resource of the PSFCH 630 may start at a location separate by the offset $\Delta_f$ value from the start PRB/subchannel index. Also, as described above, a resource corresponding to the number of PSFCH frequency resource RBs/subchannels may be allocated.

That is, in FIG. 6, a V2X SL UE that transmits sidelink data and a V2X SL UE that transmits the PSFCH may verify a start location of the frequency resource of the PSFCH 630 based on the start PRB/subchannel index in which the PSCCH 610 or the PSSCH 620 is received. Also, as described above, the offset $\Delta_f$ value may be shared in advance as in the above RRC, pre-configuration, or session establishment process. Therefore, the V2X SL UE that transmits sidelink data and the V2X SL UE that transmits the PSFCH may perform the PSFCH transmission without additional signaling.

Here, the number of PSFCH frequency resource RBs/subchannels may be determined based on a PSFCH transmission format being used. For example, PSFCH transmission format 1 may use only a single RB. Also, for PSFCH transmission format 2, the number of RBs may be determined by a base station (or a resource allocation UE) or may be pre-configured. Here, the aforementioned predetermined number of RBs may be determined based on a size of SFCI. The SFCI may be feedback information transmitted through the PSFCH. Also, for example, an available PSFCH format may be determined based on a size of SFCI supported by the PSFCH format and the number of PRBs (i.e., determined based on the PSFCH format) used by the PSFCH format may be determined as the number of PRBs/subchannels for PSFCH transmission. However, it is provided as an example only and the present disclosure is not limited thereto.

As another example, the number of PSFCH frequency resource RBs/subchannels may be determined through an RRC message. As another example, the number of PSFCH frequency resource RBs/subchannels may be determined through pre-configuration. As another example, the number of PSFCH frequency resource RBs/subchannels may be determined by a data Tx V2X SL UE. Here, the data Tx V2X SL UE may provide the number of PSFCH frequency resource RBs/subchannels to the V2X SL UE that transmits the PSFCH through a PSCCH (SCI field) that at least includes unicast/groupcast data transmission (i.e., PSSCH) resource allocation information associated with PSFCH transmission.

Also, for example, the number of PSFCH frequency resource RBs/subchannels may be determined by the base station. Here, the base station may provide information about the determined number of PSFCH frequency resource RBs/subchannels to the data Tx V2X SL UE through a PDCCH (DCI). Here, the data Tx V2X SL UE may provide again information about the number of PSFCH frequency resource RBs/subchannels to the PSFCH Tx UE through a PSCCH (SCI field) associated with the PSFCH transmission. For example, as described above, if a resource allocation mode is performed by the base station, information about the number of PSFCH frequency resource RBs/subchannels may be determined by the base station and forwarded to the V2X SL UE. However, it is provided as an example only and the present disclosure is not limited thereto.

Also, for example, the number of PSFCH frequency resource RBs/subchannels may be provided through a PSCCH (SCI field) of a UE (or a UE assisting resource allocation) supporting a data resource allocation of the V2X SL UE that transmits the PSFCH.

Also, for example, the number of PSFCH frequency resource RBs/subchannels may be provided through a PSCCH (SCI field) of another UE performing a data resource allocation of the V2X SL UE that transmits the PSFCH. However, it is provided as an example only and the present disclosure is not limited thereto.

Here, for example, in the case of the aforementioned examples of FIGS. 5 and 6, the V2X SL UE may determine a point in time at which PSFCH frequency allocation starts based on pre-configured information and may perform the PSFCH transmission and thus, additional signaling may not be required. Here, since there is no signaling about PSFCH frequency resource allocation, the flexibility of resource allocation may be degraded and a collision with another resource may be present. Therefore, operation may be performed in the aforementioned manner by considering a transmission environment.

Figure 7:
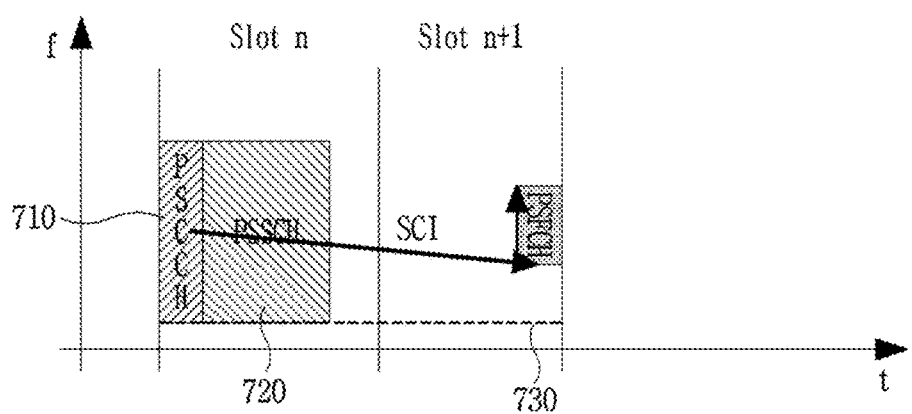
FIG. 7 illustrates a method of indicating a frequency resource of a PSFCH through a Physical Sidelink Control Channel (PSCCH) according to an example of the present disclosure.

FIG. 7 illustrates a method of indicating a start point in time of PSFCH frequency resource allocation based on the aforementioned description.

Referring to FIG. 7, a start point in time of frequency resource allocation of a PSFCH 730 may be indicated using a frequency resource (e.g., PRBs/subchannels) indicated by a PSCCH (SCI). That is, frequency resource allocation information of the PSFCH 730 may be indicated through a PSCCH. Here, a V2X SL UE may perform PSFCH transmission in a frequency resource corresponding to a number of RBs/subchannels of the frequency resource of the PSFCH 730.

Here, for example, the start point in time of frequency resource allocation may be indicated using "start PRB/subchannel index" in which a PSCCH 710 or a PSSCH 720 is received+"PRB/subchannel offset $\Delta_f$ value." In detail, only information about the offset $\Delta_f$ value may be included in the PSCCH (SCI). Here, a V2X SL UE that receives sidelink data may be aware of the start PRB/subchannel index in which the PSCCH 710 or the PSSCH 720 is received and thus, may be aware of a frequency resource start location of the PSFCH 730 through the offset $\Delta_f$ value indicated using the PSCCH (SCI).

Also, for example, a field about the offset $\Delta_f$ value may be defined in SCI. Here, the range of the offset $\Delta_f$ value may be determined based on a size of the field about the offset $\Delta_f$ value. That is, the available offset range may be set based on the set size of the field. However, it is provided as an example only and the present disclosure is not limited thereto.

As another example, in the case of a base station resource allocation mode, the offset $\Delta_f$ value may be provided from the base station to a sidelink data Tx V2X SL UE through a PDCCH (DCI). Here, the Tx V2X SL UE may indicate information about the offset $\Delta_f$ value to an Rx V2X SL UE. As another example, in the case of a UE autonomous resource selection mode, the offset $\Delta_f$ value may be provided to the sidelink data Tx V2X SL UE through a PSCCH (SCI) transmitted from a UE (e.g., a scheduling assist UE) that performs resource allocation of other V2X SL UEs. Next, the sidelink data Tx V2X SL UE may indicate information about the offset $\Delta_f$ value to the Rx V2X SL UE. Here, for example, as described above, the offset $\Delta_f$ value may be indicated based on a unit of a number of RBs or subchannels.

That is, according to FIG. 7, the offset $\Delta_f$ value may be forwarded to the V2X SL UE that performs PSFCH transmission through signaling. Through this, it is possible to improve the efficiency of resource use. Also, the UE operates based on the indicated information and thus, it is possible to decrease a resource collision probability.

Also, PSFCH transmission format 1 may use only a single RB. Also, for PSFCH transmission format 2, the number of RBs may be determined by a base station (or a resource allocation UE) or may be pre-configured. Here, the aforementioned predetermined number of RBs may be determined based on a size of SFCI. The SFCI may be feedback information transmitted through the PSFCH. Also, for example, an available PSFCH format may be determined based on a size of SFCI supported by the PSFCH format and the number of PRBs (i.e., determined based on the PSFCH format) used by the PSFCH format may be determined as the number of PRBs/subchannels for PSFCH transmission. However, it is provided as an example only and the present disclosure is not limited thereto.

As another example, the number of PSFCH frequency resource RBs/subchannels may be determined through an RRC message. As another example, the number of PSFCH frequency resource RBs/subchannels may be determined through pre-configuration. As another example, the number of PSFCH frequency resource RBs/subchannels may be determined by a data Tx V2X SL UE. Here, the data Tx V2X SL UE may provide the number of PSFCH frequency resource RBs/subchannels to the V2X SL UE that transmits the PSFCH through a PSCCH (SCI field) that at least includes unicast/groupcast data transmission (i.e., PSSCH) resource allocation information associated with PSFCH transmission.

Also, for example, the number of PSFCH frequency resource RBs/subchannels may be determined by the base station. Here, the base station may provide information about the determined number of PSFCH frequency resource RBs/subchannels to the data Tx V2X SL UE through a PDCCH (DCI). Here, the data Tx V2X SL UE may provide again information about the number of PSFCH frequency resource RBs/subchannels to the PSFCH Tx UE through a PSCCH (SCI field) associated with the PSFCH transmission. For example, as described above, if a resource allocation mode is performed by the base station, information about the number of PSFCH frequency resource RBs/subchannels may be determined by the base station and forwarded to the V2X SL UE. However, it is provided as an example only and the present disclosure is not limited thereto.

Also, for example, the number of PSFCH frequency resource RBs/subchannels may be provided through a PSCCH (SCI field) of a UE (or a UE assisting resource allocation) supporting a data resource allocation of the V2X SL UE that transmits the PSFCH.

Also, for example, the number of PSFCH frequency resource RBs/subchannels may be provided through a PSCCH (SCI field) of another UE performing a data resource allocation of the V2X SL UE that transmits the PSFCH. However, it is provided as an example only and the present disclosure is not limited thereto.

Also, for example, a start point in time of PSFCH frequency resource allocation may be indicated using the frequency resource (e.g., PRBs/subchannels) indicated by the PSCCH (SCI). Here, PSFCH transmission may be performed in the frequency resource corresponding to the number of PSFCH frequency resource RBs/subchannels. Here, the start point in time of frequency resource allocation may be determined by using "lowest subcarrier index #0 of lowest PRB of a resource pool" in which the PSCCH or the PSSCH is allocated as the start point in time of resource allocation.

That is, the start point in time of the PSFCH frequency resource may be determined based on the resource pool. Here, for example, the start point of the PSFCH frequency resource uses the subcarrier index #0 of the lowest PRB of the source pool in which the PSCCH or the PSSCH is allocated. Therefore, although the frequency resource start point is different for each of the PSCCH and the PSSCH, the same start point may be indicated. However, it is provided as an example only and the present disclosure is not limited thereto.

Here, the sidelink data Tx V2X SL UE may indicate the offset $\Delta_f$ value to the sidelink data Rx V2X SL UE through SCI.

As another example, in the case of a base station resource allocation mode, the offset $\Delta_f$ value may be provided from the base station to the sidelink data Tx V2X SL UE through a PDCCH (DCI). Here, the sidelink data Tx V2X SL UE may indicate the provided offset $\Delta_f$ value to the Rx V2X SL UE. As another example, in the case of a UE autonomous resource selection mode, the offset $\Delta_f$ value may be provided to the sidelink data Tx UE through a PSCCH (SCI) transmitted from a UE (e.g., a scheduling assist UE) that performs resource allocation of other V2X SL UEs. Here, the sidelink data Tx V2X SL UE may indicate again the offset $\Delta_f$ value to the V2X SL Rx UE. Here, as described above, the offset $\Delta_f$ value may be indicated based on a unit of the number of RBs or subchannels. As another example, if the offset $\Delta f$ value=0, it may indicate that offset is absent. That is, a start location of the PSFCH frequency resource may be the same as the start point in time of resource allocation that uses the "lowest subcarrier index #0 of the lowest PRB of the resource pool" in which the PSCCH or the PSSCH is allocated.

Here, PSFCH transmission format 1 may use only a single RB. For PSFCH transmission format 2, the number of RBs may be determined by a base station (or a resource allocation UE) or may be pre-configured. Here, for example, the aforementioned predetermined number of RBs may be determined based on a size of SFCI. Also, the number of RBs corresponding to the number of PRBs used by the corresponding PSFCH format may be determined as the number of corresponding RBs in association with the size of SFCI supported by the PSFCH format. However, it is provided as an example only and the present disclosure is not limited thereto.

Also, for example, the number of PSFCH frequency resource RBs/subchannels may be indicated or pre-configured through an RRC message. As another example, the number of PSFCH frequency resource RBs/subchannels may be determined by the data Tx V2X SL UE. Here, the data Tx V2X SL UE may provide the number of PSFCH frequency resource RBs/subchannels to the V2X SL UE that transmits the PSFCH through a PSCCH (SCI field) associated with PSFCH transmission.

Also, for example, the number of PSFCH frequency resource RBs/subchannels may be determined by the base station. Here, the base station may provide information about the determined number of PSFCH frequency resource RBs/subchannels to the data Tx V2X SL UE through a PDCCH (DCI). Here, the data Tx V2X SL UE may provide again information about the number of PSFCH frequency resource RBs/subchannels to the PSFCH Tx UE through a PSCCH (SCI field) associated with the PSFCH transmission. For example, as described above, if a resource allocation mode is performed by the base station, information about the number of PSFCH frequency resource RBs/subchannels may be determined by the base station and forwarded. However, it is provided as an example only and the present disclosure is not limited thereto.

Also, for example, the number of PSFCH frequency resource RBs/subchannels may be provided through a PSCCH (SCI field) of a UE (or a UE assisting resource allocation) supporting a data resource allocation of the V2X SL UE that transmits the PSFCH. Also, for example, the number of PSFCH frequency resource RBs/subchannels may be provided through a PSCCH (SCI field) of another UE performing a data resource allocation of the V2X SL UE that transmits the PSFCH. However, it is provided as an example only and the present disclosure is not limited thereto.

Also, for example, a start point in time of PSFCH frequency resource allocation may be determined based on the start PRB/subchannel index in which the PSCCH or the PSSCH is received. Here, the PSFCH transmission may be performed in the frequency resource corresponding to the number of PSFCH frequency resource RBs/subchannels PSFCH transmission format 1 may use only a single RB. Also, for PSFCH transmission format 2, the number of RBs may be determined by a base station (or a resource allocation UE) or may be pre-configured. Here, the aforementioned predetermined number of RBs may be determined based on a size of SFCI. The SFCI may be feedback information transmitted through the PSFCH. Also, for example, an available PSFCH format may be determined based on a size of SFCI supported by the PSFCH format and the number of PRBs (i.e., determined based on the PSFCH format) used by the PSFCH format may be determined as the number of PRBs/subchannels for PSFCH transmission. However, it is provided as an example only and the present disclosure is not limited thereto.

As another example, the number of PSFCH frequency resource RBs/subchannels may be determined through an RRC message. As another example, the number of PSFCH frequency resource RBs/subchannels may be determined through pre-configuration. As another example, the number of PSFCH frequency resource RBs/subchannels may be determined by a data Tx V2X SL UE. Here, the data Tx V2X SL UE may provide the number of PSFCH frequency resource RBs/subchannels to the V2X SL UE that transmits the PSFCH through a PSCCH (SCI field) that at least includes unicast/groupcast data transmission (i.e., PSSCH) resource allocation information associated with PSFCH transmission.

Also, for example, the number of PSFCH frequency resource RBs/subchannels may be determined by the base station. Here, the base station may provide information about the determined number of PSFCH frequency resource RBs/subchannels to the data Tx V2X SL UE through a PDCCH (DCI). Here, the data Tx V2X SL UE may provide again information about the number of PSFCH frequency resource RBs/subchannels to the PSFCH Tx UE through a PSCCH (SCI field) associated with the PSFCH transmission. For example, as described above, if a resource allocation mode is performed by the base station, information about the number of PSFCH frequency resource RBs/subchannels may be determined by the base station and forwarded to the V2X SL UE. However, it is provided as an example only and the present disclosure is not limited thereto.

Also, for example, the number of PSFCH frequency resource RBs/subchannels may be provided through a PSCCH (SCI field) of a UE (or a UE assisting resource allocation) supporting a data resource allocation of the V2X SL UE that transmits the PSFCH.

Also, for example, the number of PSFCH frequency resource RBs/subchannels may be provided through a PSCCH (SCI field) of another UE performing a data resource allocation of the V2X SL UE that transmits the PSFCH. However, it is provided as an example only and the present disclosure is not limited thereto.

FIG. 8 illustrates a method of transmitting a PSFCH based on a PSCCH. For example, PSFCH transmission may be performed in a subsequent slot in the same frequency resource (e.g., PRBs/subchannels) to which the PSCCH (SCI) is received (or allocated).

In detail, referring to FIG. 8, a Tx V2X SL UE may transmit sidelink data in an $n^{th}$ slot (slot n). Here, the V2X SL UE that transmits HARQ feedback may transmit HARQ feedback in an $(n+1)^{th}$ slot (slot n+1). Here, a time resource used for the V2X SL UE that transmits HARQ feedback to transmit the HARQ feedback may be set to be different based on the above Table 12. However, it is provided as an example only. Here, the Tx V2X SL UE may transmit, to an Rx UE, a PSCCH 810 as control information and a PSSCH 820 as data information with respect to a sidelink in the $n^{th}$ slot. Here, the V2X SL UE that transmits HARQ feedback as the Rx V2X SL UE may transmit the HARQ feedback through a PSFCH 830 in the $(n+1)^{th}$ slot through the same frequency resource (e.g., PRBs/subchannels) in which the PSCCH 810 is received. That is, the V2X SL UE that transmits the HARQ feedback may perform transmission of the PSFCH 830 through the same resource as a resource to which the PSCCH 810 is allocated.

Here, for example, referring to (a) of FIG. 8, the PSCCH 810 and the PSSCH 820 may be separately allocated in a time domain. Also, referring to (b) of FIG. 8, the PSCCH 810 and the PSSCH 820 may not be separately allocated in the time domain. Referring to (a) and (b) of FIG. 8, the frequency resource of the PSFCH 830 may be determined based on the frequency resource of the PSCCH 810. That is, the frequency resource of the PSFCH 830 may be determined based on only the frequency resource of the PSCCH 810. Here, for example, in the case of example 2, additional signaling may not be required. That is, since all of the Tx V2X SL UE and the Rx V2X SL UE recognize that the PSFCH frequency resource and the PSCCH resource are set to be the same, additional blind decoding may not be required. Therefore, signaling overhead may not occur. Also, for example, there may be no big difference between the available range of SCI bits transmitted to the PSCCH that is a control channel and the available range of SFCI bits transmitted to the PSFCH. Therefore, resources may be efficiently operated and an unnecessary resource waste may be prevented.

Figure 9:
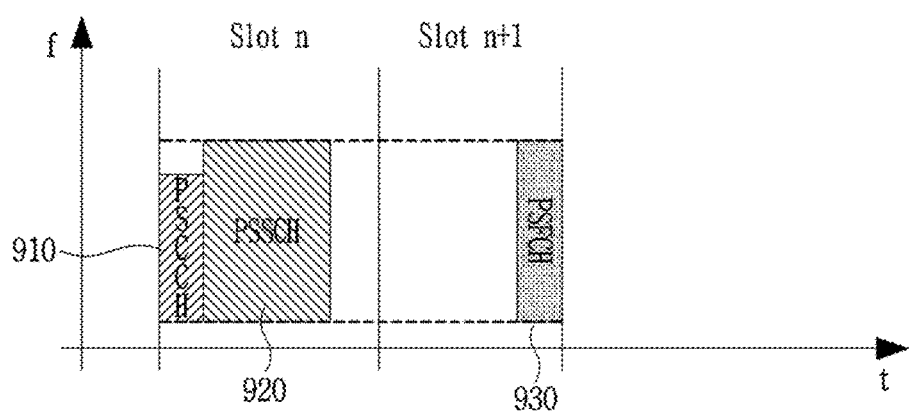
FIG. 9 illustrates a method of determining a frequency resource of a PSFCH based on a Physical Sidelink Shared Channel (PSSCH) according to an example of the present disclosure.

FIG. 9 illustrates a method of transmitting a PSFCH based on a PSSCH. For example, PSFCH transmission may be performed in a subsequent slot in the same frequency resource (e.g., PRBs/subchannels) in which the PSSCH is received (allocated).

In detail, referring to FIG. 9, a Tx V2X SL UE may transmit sidelink data in an $n^{th}$ slot (slot n). Here, the V2X SL UE that transmits HARQ feedback may transmit HARQ feedback in an $(n+1)^{th}$ slot (slot n+1). Here, a time resource used for the V2X SL UE that transmits HARQ feedback to transmit the HARQ feedback may be set to be different based on the above Table 12. However, it is provided as an example only. Here, the Tx V2X SL UE may transmit, to an Rx V2X SL UE, a PSCCH 910 as control information and a PSSCH 920 as data information with respect to a sidelink in the $n^{th}$ slot. Here, the V2X SL UE that transmits HARQ feedback as an Rx V2X SL UE may transmit the HARQ feedback through a PSFCH 930 in the $(n+1)^{th}$ slot through the same frequency resource (e.g., PRBs/subchannels) in which the PSSCH 920 is received. That is, the V2X SL UE that transmits the HARQ feedback may perform transmission of the PSFCH 930 through the same resource as a resource to which the PSSCH 920 is allocated. Here, for example, in the case of example 3, fragmentation of a frequency resource may not occur between a data channel (PSSCH) and a feedback channel (PSFCH). Here, for example, a method about at least PSFCH resource allocation in a physical layer may automatically depend on a data resource allocation method. Therefore, the PSFCH resource allocation method may be simplified. Since all of the frequency resources allocated to the PSSCH are used, a large amount of frequency resources may be used for PSFCH transmission, which may be used for an unnecessary resource. Therefore, the efficiency of resource use may be degraded. Therefore, the resource allocation method may determine the aforementioned resource by considering simplicity and resource efficiency. However, it is provided as an example only and the present disclosure is not limited thereto.

Figure 10:
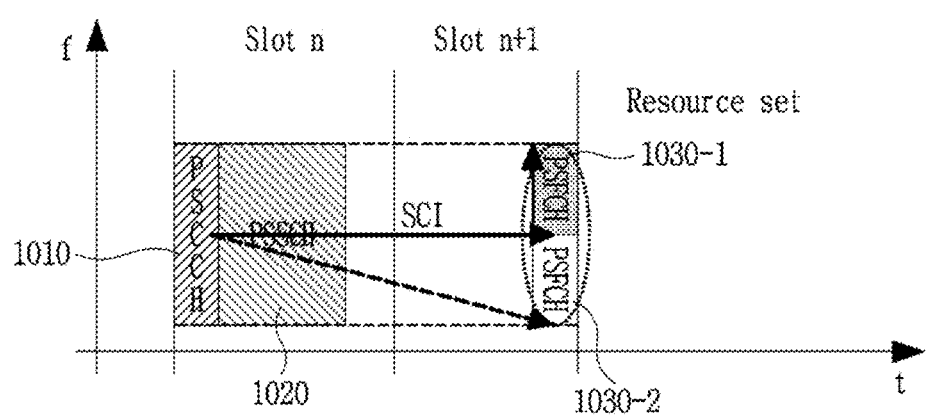
FIG. 10 illustrates a method of determining a frequency resource of a PSFCH based on a frequency resource set of the PSFCH according to an example of the present disclosure.

FIG. 10 illustrates a method of configuring in advance a PSFCH frequency resource set that includes a plurality of PSFCH frequency resources in RRC signaling or pre-configured information by a session establishment process or a base station.

Referring to FIG. 10, PSFCH frequency resource sets 1030-1 and 1030-2 each including a plurality of transmittable PSFCH frequency resources may be configured during the session establishment process. Here, a PSFCH Tx UE may select a single PSFCH frequency resource (e.g., PRBs/subchannels). Next, the PSFCH Tx V2X SL UE may perform PSFCH transmission using the selected PSFCH frequency resource (e.g., PRBs/subchannels).

In detail, as described above, the Tx V2X SL UE may transmit sidelink data in an $n^{th}$ slot. Here, the Tx V2X SL UE may transmit control information to an Rx V2X SL UE through an PSCCH 1010 and may transmit data information to an Rx V2X SL UE through a PSSCH 1020. Next, the Rx V2X SL UE may perform PSFCH transmission in an $(n+1)^{th}$ slot. Here, a time resource used for the Rx V2X SL UE to perform PSFCH transmission may be set to be different based on the above Table 12. However, it is provided as an example only. Here, if the Rx V2X SL UE performs the PSFCH transmission, the Rx V2X SL UE may perform the PSFCH transmission through a single PSFCH frequency resource (e.g., PRBs/subchannels) included in the PSFCH frequency resource set 1030-1, 1030-2 including the plurality of PSFCH frequency resources during the session process. Here, a single PSFCH frequency resource used for the PSFCH transmission may be indicated through the PSCCH (SCI). For example, the PSCCH may include a field that indicates a PSFCH frequency resource used for the PSFCH transmission in the PSFCH frequency resource set. Here, for example, a size of the field may be determined based on the number of PSFCH frequency resources included in the PSFCH frequency resource set. However, it is provided as an example only and the present disclosure is not limited thereto. Also, the aforementioned PSFCH transmission resource may refer to a time resource as well as the frequency resource. That is, a single PSFCH transmission resource index may be information that indicates a single piece of time resource information and a single piece of frequency resource information as a pair and a single PSFCH transmission resource may be selected from among one or more corresponding PSFCH transmission resources through proposed SCI signaling. The following description is made based on the PSFCH frequency resource. However, it is provided as an example only and the present disclosure is not limited thereto.

Here, for example, although FIG. 10 illustrates that a PSFCH frequency resource set includes two PSFCH frequency resources, the PSFCH frequency resource set may include two or more PSFCH frequency resources. Also, for example, during the session process, a single PSFCH frequency resource set may be indicated. The Rx V2X SL UE may perform PSFCH transmission through the indicated PSFCH frequency resource during the session process. However, it is provided as an example only. Here, since only a single PSFCH frequency is included in the PSFCH frequency resource set, the PSFCH frequency resource may be used without indication about the PSCCH.

Also, for example, a portion of the aforementioned methods may be used before completing a unicast/groupcast session. Also, a portion of the aforementioned methods may be used after completing the unicast/groupcast session. In detail, as a method preset before completing the session, a frequency resource for PSFCH transmission may be determined. Also, through indication or assistance of the base station or the UE after completing the session, a PSFCH transmission resource may be indicated or may be used for a final selection by the PSFCH Tx V2X SL UE. However, it is provided as an example only and the present disclosure is not limited thereto.

FIG. 11 illustrates a method of transmitting HARQ feedback information according to an example of the present disclosure.

Referring to FIG. 11, an Rx UE may receive a unicast/groupcast transmission-based data/control channel on a sidelink from a Tx UE (S1110). Here, as described above with reference to FIGS. 1 to 10, the Tx UE may transmit control information about sidelink data through a PSCCH that is a control channel and may transmit sidelink data through a PSSCH that is a data channel. Here, for example, the Tx UE may transmit sidelink data based on unicast or groupcast and may receive feedback information about each from the Rx UE.

Here, the Rx UE may determine a PSFCH transmission resource based on at least one of the received sidelink data/control channel, predetermined information, and indicated information (S1120). Here, as described above with reference to FIGS. 1 to 10, a time resource and a frequency resource of the PSFCH may be determined. For example, the time resource of the PSFCH may be transmitted in a specific symbol of a subsequent slot based on a slot in which sidelink data is transmitted. Also, the time resource of the PSFCH may be transmitted based on a specific symbol of a corresponding slot based on a time offset based on the slot in which sidelink data is transmitted. Also, the time resource of the PSFCH may be determined based on the above Table 12. However, it is provided as an example only and the present disclosure is not limited thereto.

Also, for example, the frequency resource of the PSFCH may be determined based on at least one of frequency resources of the PSCCH and the PSSCH. In detail, the PSFCH frequency resource may be determined based on a start location and the number of frequency resource RBs/subchannels. For example, the start location of the PSFCH frequency resource may be determined based on a start PRB/subchannel index in which the PSCCH or the PSSCH is received. Also, for example, as described above, the start location of the PSFCH frequency resource may be determined based on the start PRB/subchannel index in which the PSCCH or the PSSCH is received and offset $\Delta_f$. Here, for example, a start of the aforementioned PSFCH frequency resource may be pre-configured. That is, a UE that transmits feedback may be aware of the start location of the PSFCH frequency resource without additional signaling.

As another example, as described above, in association with the start location of the PSFCH frequency resource, the offset $\Delta_f$ may be indicated to the UE that transmits feedback through signaling.

Next, the Rx UE may transmit feedback information about data received through the determined PSFCH transmission resource through the PSFCH (S1130). Here, as described above with reference to FIGS. 1 to 10, the feedback information may be HARQ-ACK information. Also, for example, the feedback information may be CSI. As another example, the feedback information may include at least one of CQI, PMI, RI, RSRP, RSRQ, pathgain/pathloss, SRI, CRI, interference condition, and vehicle motion information. However, it is provided as an example only and the present disclosure is not limited thereto.

Example 2 (PSFCH Frequency/Code Resource Determination Method)

A PSFCH resource may be determined based on the aforementioned example 1. Here, for example, example 2 may relate to a more detailed resource allocation method than a PSFCH resource determined based on the aforementioned example 1. As another example, example 2 may be a PSFCH resource allocation method applied independently from example 1 and is not limited thereto. That is, example 2 may be applied through combination with example 1 or may be independently applied.

Here, for example, a PSFCH may be configured based on a single PRB on a frequency domain. Here, the PSFCH may be configured based on a structure using more than one PRB. However, it is provided as an example only. Also, for example, the PSFCH is also configured based on a number of subchannels that is used for transmitting the PSCCH/PSSCH. Here, a single subchannel may be an available resource index on a frequency domain. Also, the subchannel may consist of one or more PRBs. The configurations related to the subchannel may be determined through at least one of upper layer signaling (e.g., SL RRC signaling) and pre-configuration. However, it is provided as an example only and the present disclosure is not limited thereto.

Also, for example, the PSFCH resource may be configured to be present on a physical resource every N slots. Here, an N value may be set to the UE through at least one of upper layer signaling and pre-configuration. However, it is provided as an example only and the present disclosure is not limited thereto.

For example, if N=1, the PSFCH resource may be present per slot. Also, for example, if N=2, the PSFCH resource may be present per two slots. Also, for example, if N=4, the PSFCH resource may be present per four slots. However, it is provided as an example only and the present disclosure is not limited thereto.

Also, a PSFCH time resource may include a number of one or more OFDM symbols (e.g., 1~14 OFDM symbols). For example, a PSFCH transmission format to be supported may be changed based on the number of OFDM symbols included in the PSFCH time resource in a single slot. However, it is provided as an example only and the present disclosure is not limited thereto.

Also, for example, a timing relation between PSFCH transmissions associated with the PSCCH/PSSCH may be set based on at least one of the aforementioned N value and UE minimum processing time associated with the PSFCH resource. Also, for example, the timing relation between PSFCH transmissions and associated with the PSCCH/PSSCH may be further based on other elements. However, it is provided as an example only. For example, the UE may receive the PSCCH/PSSCH in a slot n. Here, the UE may perform PSFCH transmission (i.e., HARQ feedback transmission) about the PSCCH/PSSCH in a slot n+a from a last OFDM symbol of the slot n in which the PSSCH is received. Here, a variable "a" value may be a value greater than or equal to a time required for the UE to prepare the PSFCH transmission. That is, the variable "a" value may be a value that denotes a slot for the PSFCH transmission resource. Based on the aforementioned description, the UE may determine the slot n+a in which the UE may most quickly perform the PSFCH transmission by considering at least one of configuration per N slots in which the PSFCH resource is present and a time required to prepare the PSFCH transmission. Here, the UE may perform the PSFCH transmission in the determined slot n+a.

Also, for example, the PSFCH transmission may be performed based on an HARQ association slot set. Here, the HARQ association slot set may represent a set of associated PSSCH transmissions for HARQ feedback transmission. For example, as described above, the UE may perform the PSFCH transmission in the slot n+a. Here, a set of PSSCH transmission slots associated with the PSFCH transmitted in the slot n+a may be the aforementioned HARQ association slot set. Here, the HARQ association slot set is simply a single name and is interchangeably used with another name. That is, the UE may perform HARQ feedback transmission based on a set of PSSCH transmissions associated with the PSFCH transmitted in the slot n+a. However, it is provided as an example only and the present disclosure is not limited thereto.

Also, for example, V2X SL transmission may support unicast transmission and groupcast transmission. Here, for example, the UE may perform the aforementioned PSFCH transmission in the unicast transmission and the groupcast transmission. That is, the UE may perform the unicast transmission or the groupcast transmission and, based thereon, may receive feedback information based on the PSFCH transmission. For example, in the case of the groupcast transmission, all of PSCCH/PSSCH Rx UEs may need to perform HARQ feedback transmission. Here, each of the Rx UEs that perform the HARQ feedback transmission may have allocation of an independent PSFCH resource and may perform the PSFCH transmission on the allocated PSFCH resource. For clarity of description, the following description is made based on the PSCCH/PSSCH Tx UE and the Rx UE that performs the HARQ feedback transmission based on PSCCH/PSSCH reception. However, it is provided as an example only and the present disclosure is not limited thereto. That is, the aforementioned description may also apply alike to a case of a plurality of Rx UEs.

Also, for example, at least one subchannel index (e.g., lowest subchannel index/highest subchannel index) among subchannels to which the received PSCCH and/or PSSCH within the HARQ association slot set is allocated may be a reference subchannel index. Here, the reference subchannel index is simply a single name and is interchangeably used with another name. Also, for example, a single slot index (e.g., first or last slot index) to which the received PSCCH/PSSCH within the HARQ association slot set is allocated may be a reference slot index. Here, the reference slot index is simply a single name and is interchangeably used with another name. Here, for example, in the following, PSFCH resources associated with the same subchannel index may be configured to be maximally separate from each other by considering an application of a frequency offset value and an In-band Emission (IBE) issue.

Also, for example, a method of configuring PSFCH transmission resources by considering a case in which PSFCH transmission resources do not collide between the same unicast/groupcast Tx UEs is described below. Also, for example, a method of configuring PSFCH transmission resources by considering a case in which PSFCH transmission resources do not collide between different unicast/groupcast Tx UEs is described below.

Also, for example, a method of applying PSFCH frequency resource hopping for each HARQ association slot set to avoid continuous interference/collision is described below. Here, for example, a frequency hopping scheme may be determined based on a slot index (e.g., a logical slot index within an HARQ association slot set or a physical slot index within a radio frame) and/or an "SL layer-1 ID" value. Also, whether to apply frequency hopping may be pre-configured or may be determined through an upper layer configuration, which is described below.

Also, for example, a slot aggregation may be configured. Here, for example, if the slot aggregation is configured, the UE may determine a PSFCH resource by considering the slot aggregation, which is described below. Also, for example, the Rx UE may perform HARQ feedback transmission for a plurality of PSCCHs/PSSCHs received in at least one slot from a single Tx UE, which is described below.

Based on the aforementioned description, a frequency resource for PSFCH transmission may be determined. That is, a PRB index for the PSFCH transmission may be determined. Here, for example, if the PSFCH is mapped to at least one PRB, the determined PRB index may be a start (or last) index of mapping and the PSFCH is mapped on consecutive PRBs starting from (or by) the determined PRB index. That is, the PRB index for the PSFCH transmission may be implicitly derived and the frequency resource for the PSFCH transmission may be mapped based on the determined PRB index.

In detail, for example, FIG. 12 illustrates a method of performing, by UEs, PSFCH transmission. For example, in FIG. 12, an SCS may be 15 kHz. Also, the PSFCH transmission may be performed based on 1 PRB sequence. Also, the number of subchannels for a single resource pool may be 10 and the number of PRBs per single subchannel may be 4. Also, a PSFCH occasion may be present per two slots. Here, in FIG. 12, conditions for PSFCH configuration are provided as an example only and the conditions may be differently set. For example, an SCS value, the number of PRBs for PSFCH transmission, the number of subchannels present in a single resource pool, the number of PRBs per single subchannel, and PSFCH occasions may be differently set without being limited to the aforementioned example.

For example, referring to FIG. 12, a set of PSSCHs (including PSCCHs) may be associated with the PSFCH occasion. That is, each HARQ association slot set may be generated. Here, as described above, the HARQ association slot set may be determined by considering at least one of a number of slots in which the PSFCH occasion is present and a minimum processing time of a UE for HARQ feedback transmission with respect to a PSSCH associated with a PSFCH. Here, in FIG. 12, the PSFCH occasion is present per two slots and associated two PSSCH slots may be determined for each PSFCH occasion by considering the processing time of the UE. Here, for example, although FIG. 12 illustrates slots having five HARQ association relations, it is provided as an example only. Here, mapping (PSFCH slot: PSSCH slot(s)) between PSFCH slot and PSSCH slot(s) based on the HARQ association slot set may be one of 1:1, 1:2, and 1:4. However, it is provided as an example only and other mapping relations may be configured without being limited thereto.

Here, for example, the UE may perform PSFCH transmission in one or more slots in response to a single PSSCH. If a configuration for PSFCH repeat transmission is indicated to the UE, the UE may repeatedly perform PSFCH transmission in each of one or more slots. Here, resource determination for the PSFCH repeat transmission may be repeatedly performed based on a resource determined by a method proposed herein. As another example, the UE may perform PSFCH transmission in a single slot in response to at least one PSSCH in at least one slot. For example, the aforementioned transmission and reception may be associated with a single Tx UE and Rx UE. As another example, in the case of performing the PSFCH transmission in a single slot in response to at least one PSSCH in at least one slot, a plurality of Tx UEs may be associated with a single Rx UE. However, it is provided as an example only and the present disclosure is not limited thereto.

Figure 12A:
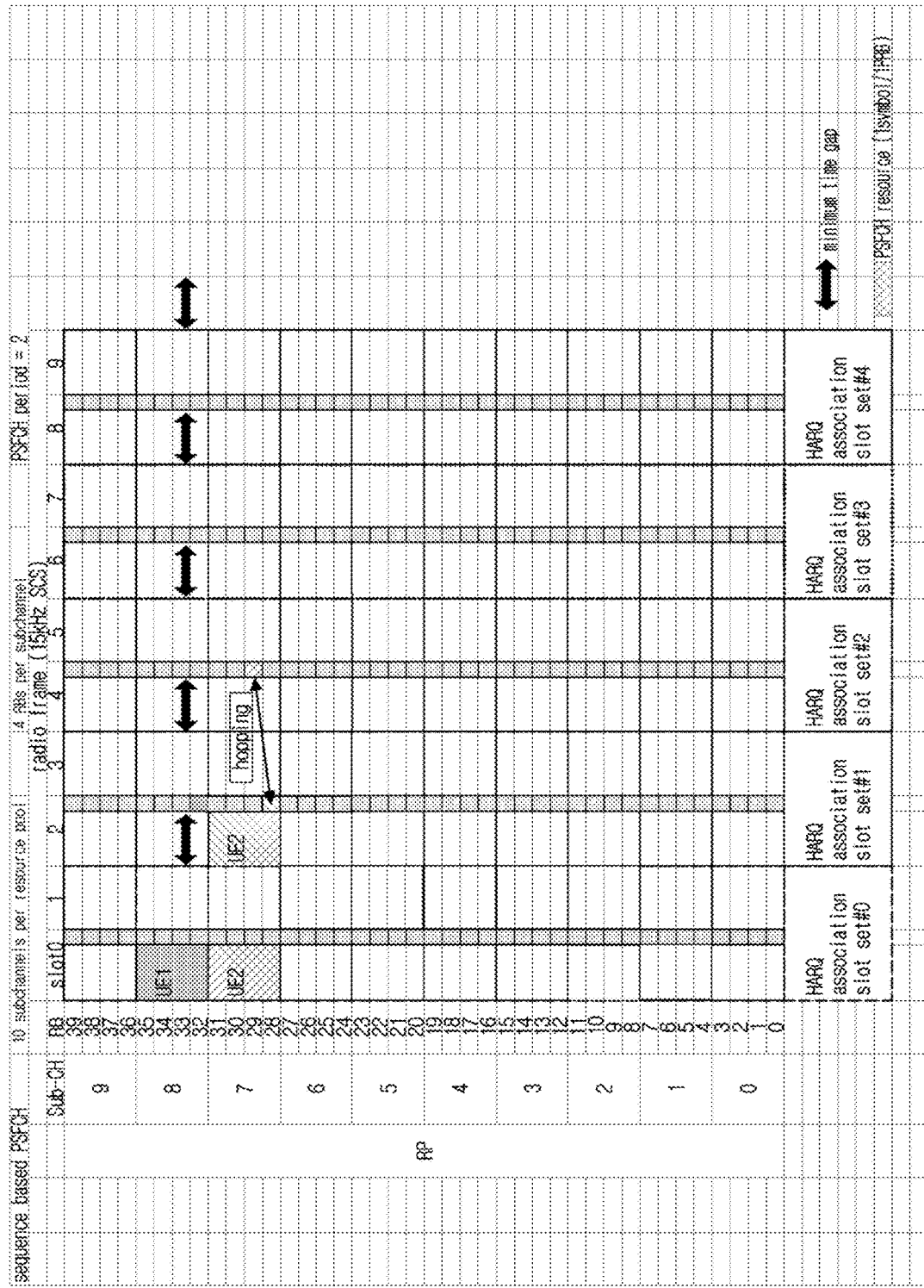
FIGS. 12A, 12B and 12C illustrate a method of transmitting, by user equipments (UEs), a PSFCH transmission.

In detail, for example, referring to FIG. 12a, the UE may perform PSFCH transmission in a single slot in response to a single PSSCH. Here, UE 1 may receive a PSCCH/PSSCH in a subchannel 8 within a slot 0. Alternatively, for example, the UE 1 may receive only the PSSCH in the subchannel 8 within the slot 0. Here, the UE 1 may prepare and transmit HARQ feedback in a slot 2 by considering at least one of a PSFCH occasion and a minimum processing time. The UE 1 may perform HARQ feedback transmission in a PRB having a lowest index in a subchannel 8 within the slot 2. Also, for example, UE 2 may receive the PSCCH/PSSCH in a subchannel 7 within the slot 0. Alternatively, for example, the UE 2 may receive the PSSCH in the subchannel 7 within the slot 0. Here, the UE 2 may prepare and transmit HARQ feedback in a PSFCH resource within the slot 2.

Also, for example, the UE 2 may receive the PSCCH/PSSCH in the subchannel 7 within the slot 2. Alternatively, for example, the UE 2 may receive the PSSCH in the subchannel 7 within the slot 2. Here, the UE 2 may prepare and transmit HARQ feedback in a PSFCH resource within a slot 4. For example, the UE 2 may transmit HARQ feedback through a PRB having a lowest index in the subchannel 7 within the slot 2. In contrast, if the UE 2 performs HARQ feedback transmission in the slot 4, the UE 2 may transmit HARQ feedback through a PRB having a subsequent index of the subchannel 7 based on frequency hopping. That is, the UE 2 may perform frequency hopping to minimize undesired continuous PSFCH interference. In detail, for example, the UE may perform frequency hopping through a time index (e.g., a physical slot index or a slot index within an HARQ association slot set) and/or "SL layer-1 ID." For example, a frequency hopping function may be applied in an enabled state at all times. Also, for example, whether to apply frequency hopping may be determined through upper layer signaling or pre-configuration. However, it is provided as an example only and the present disclosure is not limited thereto.

Figure 12B:
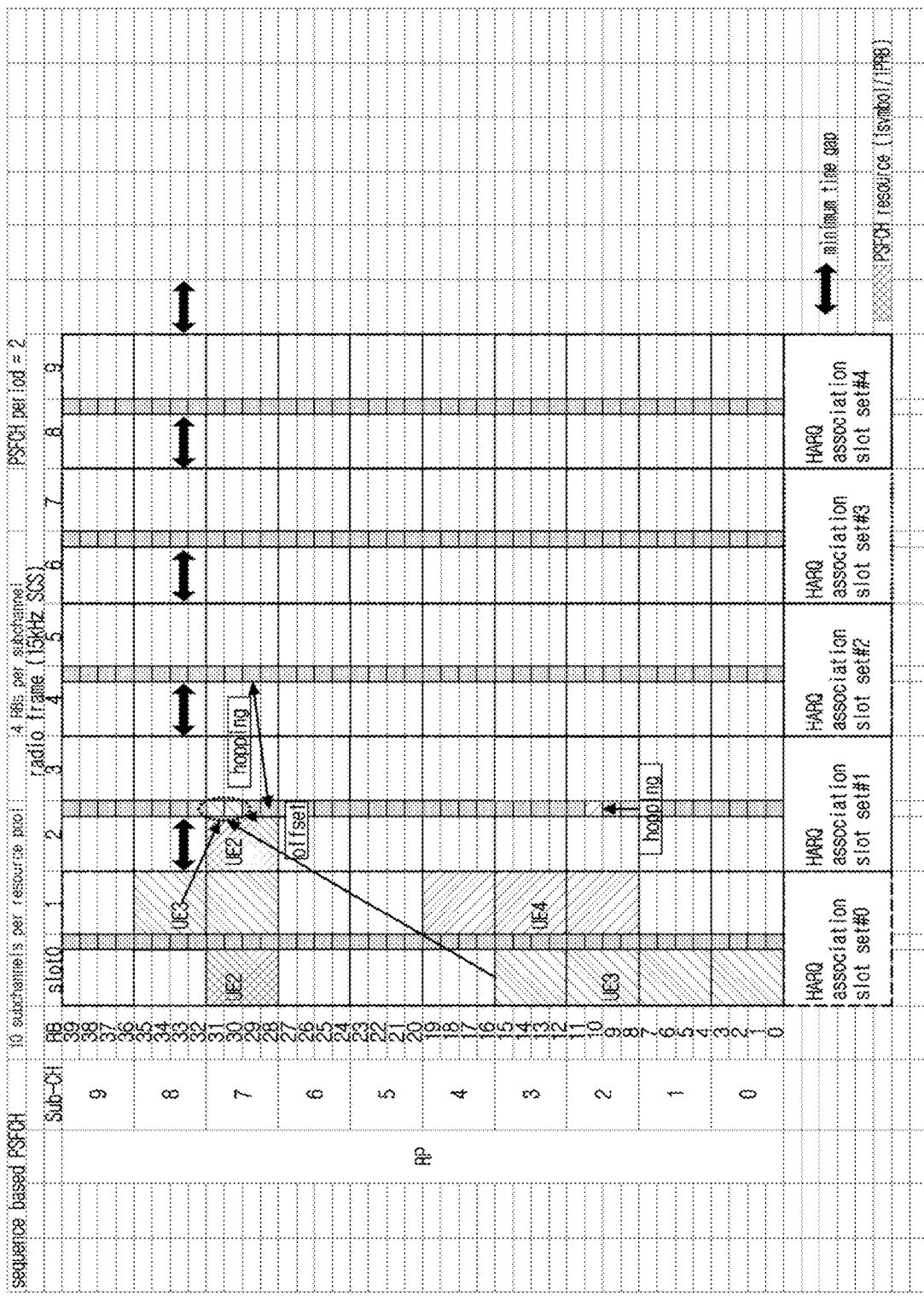

Also, for example, referring to FIG. 12b, the UE may perform PSFCH transmission in a single slot in response to at least one PSSCH in at least one slot. Here, for example, the UE 2 may receive a PSCCH/PSSCH in a subchannel 7 within a slot 0. Alternatively, for example, the UE 2 may receive the PSSCH in the subchannel 7 within the slot 0. Here, the UE 2 may transmit the PSFCH including HARQ feedback information about the PSSCH received in the slot 0 through a PSFCH resource within a slot 2. Also, the UE 2 may receive the PSCCH/PSSCH in a subchannel 7 within the slot 2. Alternatively, for example, the UE 2 may receive the PSSCH in the subchannel 7 within the slot 2. Here, the UE 2 may prepare and transmit HARQ feedback in a PSFCH resource within a slot 4. For example, the PSFCH resource in which the UE 2 transmits HARQ feedback in the slot 4 may be set through hopping from the PSFCH resource in which the UE 2 transmits HARQ feedback in the slot 2, which is described below.

UE 3 may receive the PSCCH/PSSCH in subchannels from a subchannel 0 within the slot 0 to a subchannel 3 within the slot 0. Alternatively, for example, the UE 3 may receive only the PSSCH only in subchannels from the subchannel 0 to the subchannel 3 within the slot 0. Also, the UE 3 may receive the PSCCH/PSSCH in subchannels from a subchannel 7 to a subchannel 8 within a slot 1. Alternatively, for example, the UE 3 may receive only the PSSCH in subchannels from the subchannel 7 to the subchannel 8 within the slot 1. Here, the UE 3 may prepare HARQ feedback in the slot 2 by considering at least one of a PSFCH occasion and a minimum processing time. For example, the slot 0 and the slot 1 in which the UE 3 performs transmission may be included in the same HARQ association slot set and the UE 3 may transmit all of HARQ feedback corresponding to the slot 0 and the slot 1 in the slot 2. For example, the UE 3 may perform HARQ feedback transmission through two PRBs of the subchannel 7 within the slot 2, or may perform the HARQ feedback transmission through a single PRB based on a PSFCH format. However, it is provided as an example only. Here, all of the PSFCH transmission of the UE 2 and PSFCH transmission of the UE 3 may be performed through the subchannel 7 within the slot 2. For example, a PRB offset may be applied to prevent a collision between the PSFCH transmission of the UE 2 and the PSFCH transmission of the UE 3, which is described below.

Also, for example, UE 4 may receive a PSCCH/PSSCH in subchannels from a subchannel 2 to a subchannel 4 within the slot 1. Alternatively, for example, the UE 4 may receive the PSSCH in subchannels from the subchannel 2 to the subchannel 4 within the slot 1. Here, for example, the UE 4 may transmit HARQ feedback through a PRB (index 10) to which a PRB offset is applied in a PRB having a lowest index in the subchannel 2 in the slot 2.

Figure 12C:
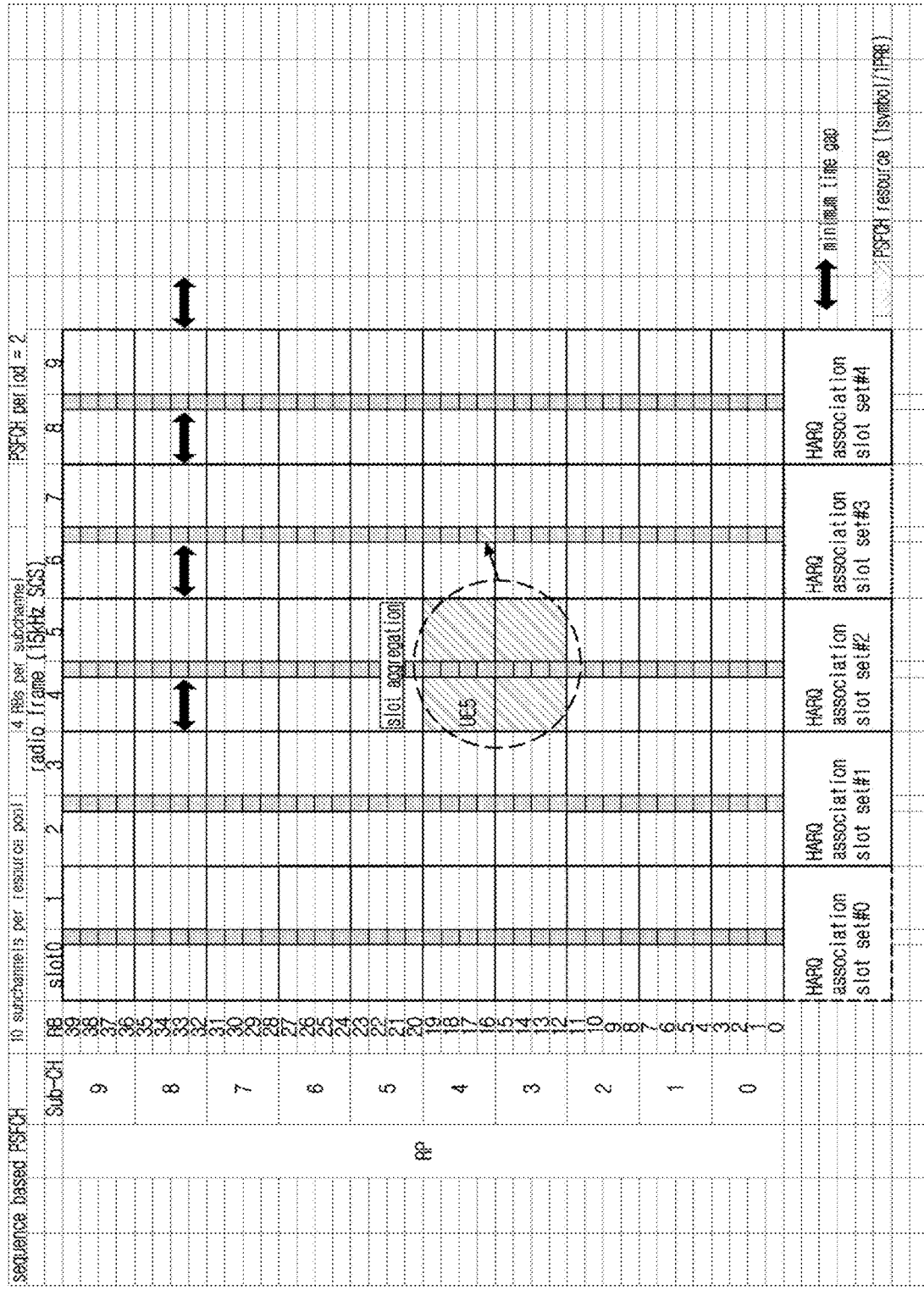

Also, for example, referring to FIG. 12(c), UE 5 may receive a PSCCH/PSSCH in subchannels from a subchannel 3 to a subchannel 4 within a slot 4 and a slot 5 based on a slot aggregation. Alternatively, for example, the UE 5 may receive only the PSSCH in subchannels from the subchannel 3 to the subchannel 4 within the slot 4 and the slot 5 based on the slot aggregation. Here, the UE 5 may prepare HARQ feedback in a slot 6 by considering at least one of a PSFCH occasion and a minimum processing time. For example, the UE 5 may prepare and transmit HARQ feedback in a single PRB within the slot 6 based on the slot aggregation. However, it is provided as an example only. Also, for example, in the case of applying the slot aggregation, the UE may determine a PSFCH frequency resource based on a last slot among aggregated slots to which a single PSSCH is allocated. That is, the UE may handle the PSFCH transmission in various forms. However, it is provided as an example only and the present disclosure is not limited thereto.

FIG. 13 illustrates a resource allocation method considering transmissions having the same subchannel index and different slot indices.

Figure 13A:
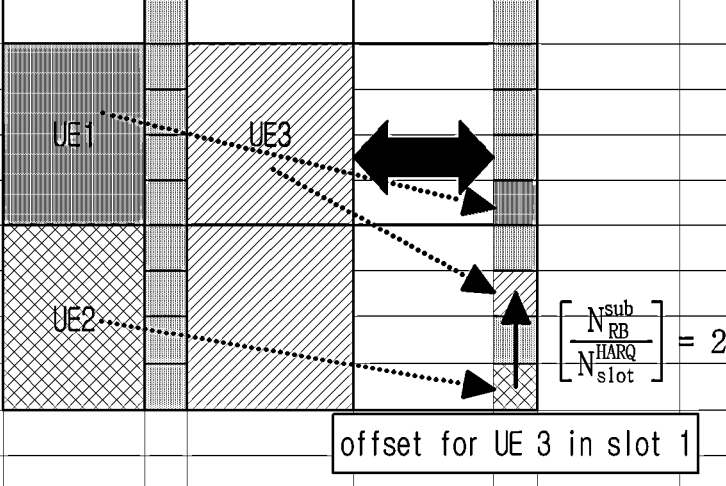

For example, referring to FIG. 13a, UE 1 and UE 2 may have the same slot index and may have different subchannel indices for two PSSCHs. Here, for example, the UE 1 may perform a PSFCH transmission based on a subchannel index in which a PSCCH/PSSCH is received and the UE 2 may also perform the PSFCH transmission based on a subchannel index in which the PSCCH/PSSCH is received.

In contrast, the UE 2 and UE 3 may have the same subchannel index and may have different slot indices. Here, for example, the UE 2 and the UE 3 may receive the PSCCH/PSSCH within a single HARQ association slot set and, based thereon, may perform the PSFCH transmission in the same slot index (e.g., slot 2). Also, each of the UE 2 and the UE 3 may perform a unicast transmission and reception with a different UE. Here, there is a need to prevent a collision between the PSFCH transmission of the UE 2 and the PSFCH transmission of the UE 3. By considering the aforementioned aspect, a PRB offset value may be applied. In detail, referring to FIG. 13a, a PSFCH transmission frequency resource of the UE 2 and a PSFCH transmission frequency resource of the UE 3 may be allocated based on the PRB offset.

In detail, for example, the PRB offset value may be applied for each slot index within a single HARQ association slot set based on the following Equation 3.

$$PRB \text{ offset} = \left\lfloor \frac{n_{RB}^{sub}}{n_{slot}^{HARQ}} \right\rfloor \quad \text{[Equation 3]}$$

In Equation 3, $n_{RB}^{sub}$ denotes the number of PRBs per subchannel, and $n_{slot}^{HARQ}$ denotes a size of the HARQ association slot set. Here, in FIG. 13, the number of PRBs per subchannel $n_{RB}^{sub}=4$. Also, the size of the HARQ association slot set $n_{slot}^{HARQ}=2$. Therefore, $$\left\lfloor \frac{n_{RB}^{sub}}{n_{slot}^{HARQ}} \right\rfloor = 2.$$

Accordingly, a PSFCH transmission resource collision for the PSSCH allocated to the same subchannel may be avoided based on different slot index. Here, for example, in FIG. 13, the number of PRBs per subchannel=4. However, the number of PRBs per subchannel may be differently set. Also, if the number of PRBs per subchannel increases (e.g., 20, 40, 50 or 100 . . . ), a PRB offset value may further increase based on Equation 3.

Also, for example, in the case of applying the PRB offset based on the above Equation 3, the offset value may be configured to not exceed the number of PRBs that constitute a single subchannel. For example, the above UE 1 may perform the PSFCH transmission through a subchannel adjacent to a subchannel to which the UE 2 and the UE 3 are allocated. Therefore, if the PSFCH transmission resource of the UE 3 is allocated to a different subchannel based on the above Equation 3, the PSFCH transmission resource of the UE 3 may collide with the PSFCH transmission resource of the UE 1. By considering the above aspect, the PRB offset may be set to be less than or equal to the number of PRBs per subchannel. Here, for example, if the PSFCH is continuously mapped on a plurality of PRBs, the PRB index determined by Equation 3 may be a start (or last) PRB index among the plurality of PRBs. In contrast, if the PSFCH is mapped on a single PRB, the PRB index determined by Equation 3 may be a PRB corresponding to a PSFCH resource.

In detail, for example, by considering the above aspect, the PRB index may be set based on the following Equation 4 or Equation 5.

$$\text{PSFCH PRB index} = n_{sub} \times n_{RB}^{sub} \times n_{slot}^{HARQ} \times \left\lfloor \frac{n_{RB}^{sub}}{n_{slot}^{HARQ}} \right\rfloor \qquad \text{[Equation 4]}$$

$$\text{PSFCH PRB index} = $$
$$n_{sub} \times n_{RB}^{sub} \times n_{slot}^{HARQ} \times \left\lfloor \frac{n_{RB}^{sub}}{n_{slot}^{HARQ}} \right\rfloor + n_{ID}^{SL} \times \left\lfloor \frac{n_{RB}^{sub}}{n_{slot}^{HARQ}} \right\rfloor \qquad \text{[Equation 5]}$$

For example, in Equation 4, $n_{sub}$ denotes a subchannel index. Here, in FIG. 13, if the PRB index of each of the UE 2 and the UE 3 is set based on Equation 4, the PSFCH PRB index of the UE 2 may be "7*4+0*2=28." In contrast, the PSFCH PRB index of the UE 3 may be "7*4+1*2=30." That is, each of the UE 2 and the UE 3 may receive the PSCCH/PSSCH through a different slot of the HARQ association slot set, and may perform the PSFCH transmission through the same subchannel in the same slot. Here, the PSFCH transmission resource of the UE 2 and the PSFCH transmission resource of the UE 3 may be allocated to different PRBs in the subchannel based on the above Equation 4.

Also, for example, in Equation 5, $$\text{``} n_{ID}^{SL} \times \left\lfloor \frac{n_{RB}^{sub}}{n_{slot}^{HARQ}} \right\rfloor \text{''}$$

may be used as the PRB offset value. Therefore, the PRB offset value may be differently determined based on a SLID value. Through this, different PRB indices may be set. As described above, without using a hopping method, it is possible to further efficiently use the PSFCH resource. That is, instead of using a specific PRB in a single subchannel, a random PRB may be determined through interaction with an ID value. Here, for example, an SLID nip value may be an ID value that is generated based on one or combination of at least one of ID values of the following Table 13. Here, the generated ID value may be an ID value used in a physical layer. Here, the SLID value may be set as a different ID value. However, it is provided as an example only and the present disclosure is not limited thereto.

TABLE 13

ID of PSSCH Tx UE (i.e., source ID)
ID for reception of PSSCH Tx UE (i.e., destination ID)
In the case of groupcast, groupcast ID (i.e., groupcast destination ID)
HARQ process ID associated with PSSCH transmission and reception
Zone ID in which a PSSCH Tx/Rx UE is located
Group UE ID for identifying each UE in a corresponding group
Random ID potentially requirable to minimize interference in a physical layer Also, for example, referring to FIG. 13b, the UE 2 may receive a PSCCH/PSSCH from a single Tx UE or a plurality of Tx UEs in a slot 0 and a slot 1. Here, for example, the UE 2 may receive the PSCCH/PSSCH through a plurality of slots in a single HARQ association slot set and, based thereon, may perform PSFCH transmission in the same slot index (e.g., slot 2). Here, for example, the UE 2 may perform the PSFCH transmission in different PRBs with respect to the PSCCH/PSSCH received in each slot. For example, each PSFCH resource transmitted from the UE may be determined based on the above Equation 4 or Equation 5. That is, the UE 2 may perform the PSFCH transmission in different PRBs based on the PRB offset value with respect to the PSCCH/PSSCH received in each slot.

Figure 13C:
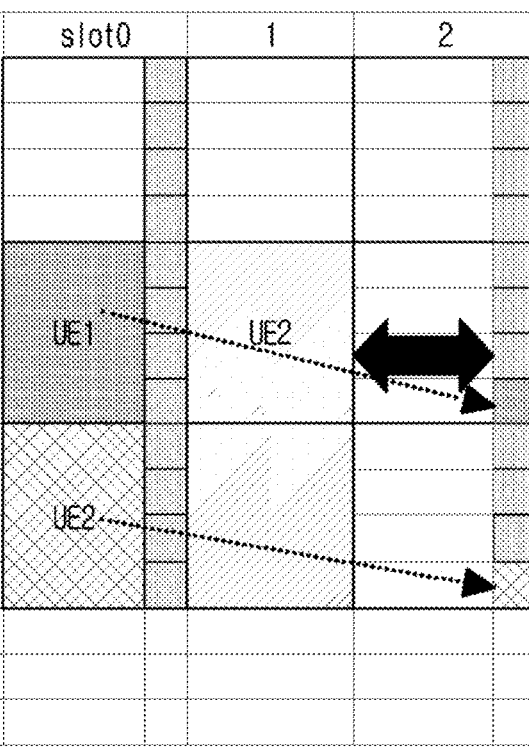
Figure 13D:
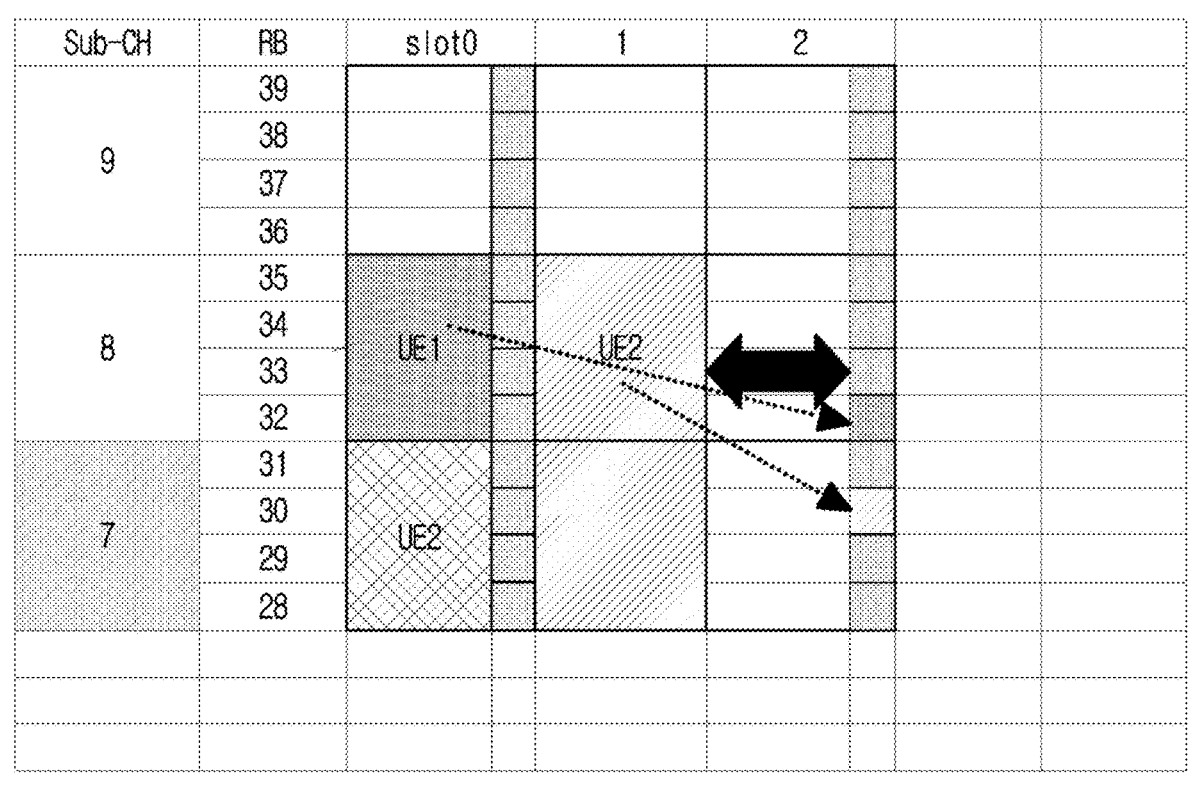

Also, for example, referring to FIGS. 13c and 13d, the UE 2 may receive a PSCCH/PSSCH from a plurality of Tx UEs in a slot 0 and a slot 1. Here, for example, the UE 2 may receive the PSCCH/PSSCH from a first Tx UE through a subchannel 7 in the slot 0 within a single HARQ association slot set and, based thereto, may perform the PSFCH transmission in the same slot index (e.g., slot 2). Also, the UE 2 may receive the PSCCH/PSSCH from a second Tx UE through a subchannel 7 to a subchannel 8 in the slot 1 within the same HARQ association slot set and, based thereto, may perform the PSFCH transmission in the same slot index (e.g., slot 2). Here, for example, only a PSFCH transmission for PSSCH transmission of a UE having a relatively high priority may be performed in a single slot. That is, an HARQ feedback transmission for PSSCH transmission of a UE having a relatively low priority may be dropped.

For example, the UE 2 may transmit HARQ feedback to all of the first Tx UE and the second Tx UE in the slot 2. Here, for example, if the UE 2 transmits HARQ feedback to all of the first Tx UE and the second Tx UE in the slot 2, the UE 2 may perform the PSFCH transmissions to each of the first Tx UE and the second through different PRBs, respectively as shown in FIG. 13a.

As another example, referring to FIG. 13c, if PSSCH from the first Tx UE has a higher priority than that of the second Tx UE, the UE 2 may transmit a PSFCH for the PSSCH received from the first Tx UE in the slot 2. That is, the UE 2 may drop HARQ feedback transmission for the PSSCH received from the second Tx UE. In contrast, referring to FIG. 13d, if the second Tx UE has a higher priority than the first Tx UE, the UE 2 may transmit a PSFCH for the PSSCH received from the second Tx UE in the slot 2. That is, the UE 2 may drop HARQ feedback transmission for the PSSCH received from the first Tx UE.

As another example, a PSFCH PRB index may be determined by considering a case of groupcast transmission and may be determined based on the following Equation 6 or Equation 7.

[Equation 6]
$$\text{PSFCH PRB index} = n_{sub} \times N_{RB}^{sub} + n_{slot}^{HARQ} \times \left\lfloor \frac{n_{RB}^{sub}}{n_{slot}^{HARQ}} \right\rfloor + \left\lfloor \frac{n_{ID}^{G}}{n_{CDM}^{RB}} \right\rfloor$$

[Equation 7]
$$\text{PSFCH PRB index} = n_{sub} \times N_{RB}^{sub} + n_{slot}^{HARQ} \times \left\lfloor \frac{n_{RB}^{sub}}{n_{slot}^{HARQ}} \right\rfloor + \left\lfloor \frac{n_{ID}^{G}}{n_{CDM}^{RB}} \right\rfloor \bmod \left\lfloor \frac{n_{RB}^{sub}}{n_{slot}^{HARQ}} \right\rfloor$$

Here, in the above Equation 6 and Equation 7, nip denotes group member ID information for identifying Rx UEs in a group for groupcast. For example, if the number of group members=4, nip may be allocated each of the group members by using one of 0, 1, 2 and 3 as a single ID value. Here, each of the group members may allocate a different frequency/code resource for PSFCH transmission based on the allocated ID value. Here, each group member may receive allocation of a different frequency/code resource for the PSFCH transmission through the ID value.

For example, in the case of unicast, nip may be set to 0. Here, if $n_{ID}^{G}=0$, Equation 6 may be equal to Equation 4. Also, for example, unicast/groupcast may be set to a UE physical layer by an upper layer. However, it is provided as an example only and the present disclosure is not limited thereto.

Also, for example, $N_{CDM}^{RB}$ denotes a total number of code resources capable of identifying HARQ feedback transmission using a different sequence in a single RB. Here, for example, $N_{CDM}^{RB}$ may be set to the UE physical layer by the upper layer. For example, if the number of UEs capable of using different sequences in a single RB is 2, group members 0 and 1 may be multiplexed through code division multiplexing (CDM) in the same RB based on the above Equation 6. In contrast, other group members 2 and 3 may be mapped to another RB based on $$\left\lfloor \frac{n_{ID}^{G}}{n_{CDM}^{RB}} \right\rfloor.$$

Alternatively, although mappable to another RB based on $n_{ID}^{G} \bmod N_{CDM}^{RB}$, group members 0 and 2 may be mapped through CDM in the same RB in this case. In contrast, other members 1 and 3 may be mapped to another RB based on $n_{ID}^{G} \bmod N_{CDM}^{RB}$. Therefore, $$\left\lfloor \frac{n_{ID}^{G}}{N_{CDM}^{RB}} \right\rfloor$$

in the following equations as well as the above Equation 6/7 may be replaced with $n_{ID}^{G} \bmod N_{CDM}^{RB}$ and thereby used. Although the following description is made based on an example in which $$\left\lfloor \frac{n_{ID}^{G}}{N_{CDM}^{RB}} \right\rfloor$$

is applied, it is provided as an example only.

As described above, $n_{sub}$ may be a single subchannel index (e.g., 0~9 in FIG. 12, 13) among subchannels to which the received PSSCH is allocated. Here, $n_{sub}$ may have the range of 0 to $n_{sub}^{pool}-1$. Here, the subchannel index may correspond to a smallest value or a largest value among the subchannels to which the received PSSCH is allocated. However, it is provided as an example only. That is, $n_{sub}$ may refer to a reference subchannel index value used to induce a PSFCH resource. Also, $n_{sub}^{pool}$ denotes a total number of subchannels set in a single resource pool. However, it is provided as an example only.

Also, for example, $n_{sub}^{RB}$ denotes the number of PRBs per set subchannel. Here, for example, $n_{RB}^{sub}$ may be one of values greater than 4 and may be used based on an upper layer configuration or a pre-configuration value. However, it is provided as an example only.

Also, for example, $n_{slot}^{HARQ}$ denotes each associated slot index in the HARQ association slot set. For example, $n_{slot}^{HARQ}$ may be a set of slots corresponding to PSSCH reception associated with a single PSFCH transmission for an HARQ operation. For example, a slot index may be defined as a logical slot index. As another example, the slot index may be defined as a physical slot index. However, it is provided as an example only. Here, for example, $n_{slot}^{HARQ}$ may be set based on the aforementioned size N of the HARQ association slot set and may be represented as the following Table 14.

TABLE 14

N = 1, $n_{slot}^{HARQ}$ = {0}
N = 2, $n_{slot}^{HARQ}$ = {0, 1}
N = 4, $n_{slot}^{HARQ}$ = {0, 1, 2, 3}

Here, the above Table 14 may refer to a case of using the logical slot index. For example, in the case of using the physical slot index, physical slots present in a single radio frame may be indexed from 0 to $N_{slot}^{frame}-1$ and thereby used. For example, $N_{slot}^{frame}$ denotes a total number of slots present in a single frame.

Also, for example, in the case of applying the number of logical slots, $n_{slot}^{HARQ}$ denotes a total number of logical slots within a single HARQ association slot set. Also, for example, $n_{occasion}^{PSFCH}$ or $n_{slot}^{PSFCH}$ denotes a PSFCH occasion index. Here, $n_{occasion}^{PSFCH}$ or $n_{slot}^{PSFCH}$ may be set to be present per N slots as an index in which a PSFCH resource is present. Also, for example, as described above, one of 1, 2, and 4 may be set as a value of N. Also, for example, the aforementioned index may be replaced with a slot index value, which is described below.

FIG. 14 illustrates a method of applying additional frequency hopping to a PSFCH transmission. Referring to FIG. 14, a UE may perform a PSFCH transmission based on frequency hopping. Here, a time point at which a frequency hopping method is applied may be a slot or OFDM symbol unit. For example, the PSFCH transmission may be performed on different frequency per slot. As another example, the PSFCH transmission may be performed on different frequency per a plurality of OFDM symbols within a single slot. Here, for example, the following Equation 8 may represent a PRB index in which the PSFCH is transmitted in the case of applying frequency hopping per slot. Here, in the following Equation 8, frequency hopping may be performed based on a PSFCH slot index (or a PSFCH occasion index) and SL layer-ID. Here, for example, as described above, frequency hopping may be performed in the same subchannel. However, it is provided as an example only and the present disclosure is not limited thereto.

$$PSFCH\ PRB\ \text{index} = n_{sub} \times N_{RB}^{sub} + n_{slot}^{harq} \times \left\lfloor \frac{N_{RB}^{sub}}{n_{slot}^{HARQ}} \right\rfloor + (n_{slot}^{PSFCH} + n_{ID}^{SL}) \bmod \left\lfloor \frac{N_{RB}^{sub}}{n_{slot}^{HARQ}} \right\rfloor : \text{per slot} \quad [\text{Equation 8}]$$

Also, for example, the following Equation 9 may represent a PRB index in which the PSFCH is transmitted in the case of applying frequency hopping per OFDM symbol. Here, in the following Equation 9, frequency hopping may be performed based on a PSFCH slot index (or a PSFCH occasion index) and SL layer-ID. Here, for example, frequency hopping may be applied per OFDM symbol and thus, OFDM symbol (1) may be further considered in the following Equation 9. Also, for example, as described above, frequency hopping may be performed in the same subchannel. However, it is provided as an example only and the present disclosure is not limited thereto.

$$PSFCH\ PRB\ \text{index} = n_{sub} \times N_{RB}^{sub} + n_{slot}^{harq} \times \left\lfloor \frac{N_{RB}^{sub}}{n_{slot}^{HARQ}} \right\rfloor + (n_{slot}^{PSFCH} + l + n_{ID}^{SL}) \bmod \left\lfloor \frac{N_{RB}^{sub}}{n_{slot}^{HARQ}} \right\rfloor : \text{per OFDM symbol(1)} \quad [\text{Equation 9}]$$

Also, for example, the following Equation 10 may represent a PRB index in which the PSFCH is transmitted in the case of applying frequency hopping per slot. Here, in the following Equation 10, frequency hopping may be performed based on SL layer-ID, which differs from Equation 8. Here, for example, as described above, frequency hopping may be performed in the same subchannel. However, it is provided as an example only and the present disclosure is not limited thereto.

$$PSFCH\ PRB\ \text{index} = n_{sub} \times N_{RB}^{sub} + n_{slot}^{harq} \times \left\lfloor \frac{N_{RB}^{sub}}{n_{slot}^{HARQ}} \right\rfloor + n_{ID}^{SL} \bmod \left\lfloor \frac{N_{RB}^{sub}}{n_{slot}^{HARQ}} \right\rfloor \text{per slot} \quad [\text{Equation 10}]$$

Also, for example, the following Equation 11 may represent a PRB index PRB index in which the PSFCH is transmitted in the case of applying frequency hopping per OFDM symbol. Here, in the following Equation 11, frequency hopping may be performed based on SL layer-ID, which differs from Equation 9. Here, for example, frequency hopping may be performed per OFDM symbol, OFDM symbol (1) may be further considered in Equation 9 compared to Equation 10. Also, for example, as described above, frequency hopping may be performed in the same subchannel. However, it is provided as an example only and the present disclosure is not limited thereto.

$$PSFCH\ PRB\ \text{index} = n_{sub} \times N_{RB}^{sub} + n_{slot}^{harq} \times \left\lfloor \frac{N_{RB}^{sub}}{N_{slot}^{HARQ}} \right\rfloor + (n_{ID}^{SL} + l) \bmod \left\lfloor \frac{N_{RB}^{sub}}{N_{slot}^{HARQ}} \right\rfloor \text{per OFDM symbol} \quad [\text{Equation 11}]$$

Also, for example, frequency hopping may be applied by considering a groupcast transmission. Here, the following Equation 12 may be generated by further considering $$\left\lfloor \frac{n_{ID}^{G}}{N_{CDM}^{RB}} \right\rfloor$$

in Equation 8. Here, for example, as described above, $n_{ID}^{G}$ denotes ID allocated to a group member and $N_{CDM}^{RB}$ denotes a total number of code resources capable of classifying HARQ transmission using different sequences in a single RB. Here, for example, in the case of unicast transmission, nip may be 0. In the above case, Equation 12 may be equal to Equation 8. Here, for example, similar to the aforementioned Equation 8, frequency hopping in Equation 12 may be performed based on a PSFCH slot index (or a PSFCH occasion index) and SL layer-ID and a value of $$\left\lfloor \frac{n_{ID}^{G}}{N_{CDM}^{RB}} \right\rfloor$$

may be further considered by considering groupcast.

$$PSFCH\ PRB\ \text{index} = n_{sub} \times N_{RB}^{sub} + n_{slot}^{harq} \times \left\lfloor \frac{N_{RB}^{sub}}{N_{slot}^{HARQ}} \right\rfloor + \left(n_{slot}^{PSFCH} + n_{ID}^{SL} + \left\lfloor \frac{n_{ID}^{G}}{N_{CDM}^{RB}} \right\rfloor\right) \bmod \left\lfloor \frac{N_{RB}^{sub}}{N_{slot}^{HARQ}} \right\rfloor \quad [\text{Equation 12}]$$

Also, for example, the following Equation 13 may be generated by further considering a value of $$\left\lfloor \frac{n_{ID}^{G}}{N_{CDM}^{RB}} \right\rfloor$$

in Equation 10. Here, for example, as described above, nip denotes an ID allocated to a group member and $N_{CMD}^{RB}$ denotes a total number of code resources capable of classifying HARQ-ACK transmission using different sequences in a single RB. Here, for example, in the case of unicast transmission, $n_{ID}^{G}$ may be 0. In the above case, Equation 13 may be equal to Equation 10.

$$PSFCH\ PRB\ \text{index} = n_{sub} \times N_{RB}^{sub} + n_{slot}^{harq} \times \left\lfloor \frac{N_{RB}^{sub}}{N_{slot}^{HARQ}} \right\rfloor + \left(n_{ID}^{SL} + \left\lfloor \frac{n_{ID}^{G}}{N_{CDM}^{RB}} \right\rfloor\right) \bmod \left\lfloor \frac{N_{RB}^{sub}}{N_{slot}^{HARQ}} \right\rfloor \quad [\text{Equation 13}]$$

Figure 14A:
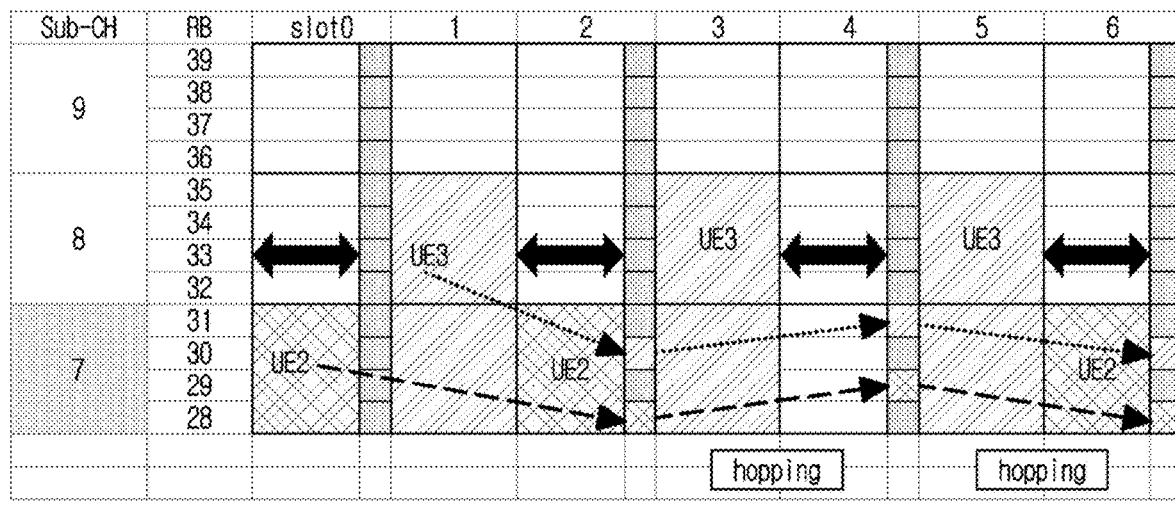
FIGS. 14A, 14B, and 14C illustrate a method of applying additional frequency hopping to a PSFCH transmission.

Based on the aforementioned description, frequency hopping may be performed. In detail, for example, FIG. 14a illustrates a case of $N_{RB}^{sub}=4$. That is, a subchannel includes four RBs and frequency hopping may be performed based on the above equations per slot in each subchannel. Here, for example, as described above, frequency hopping may be set based on a PRB offset that does not exceed the number of subchannel PRBs by considering a potential collision with another UE.

Figure 14B:
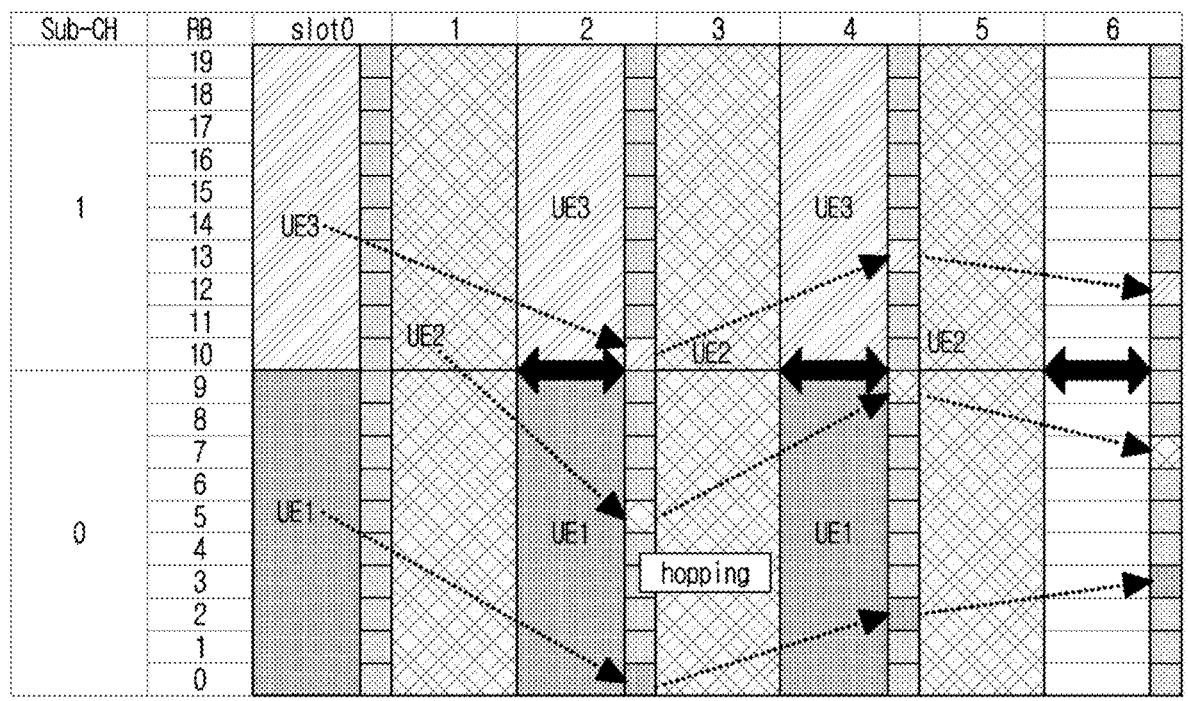

Also, for example, FIG. 14b illustrates a case of $N_{RB}^{sub}=10$. That is, a subchannel includes 10 RBs and frequency hopping may be performed based on the above equations per slot in each subchannel. Here, for example, a PRB offset value for frequency hopping may be determined by considering a potential collision with other UEs. For example, in FIG. 14b, all of PSFCH transmission of UE 1 and PSFCH transmission of UE 2 may be performed in a slot 2. Here, for example, as described above, each UE may transmit each PSFCH based on a different PRB index in the same slot based on PRB offset. Here, for example, frequency hopping may be performed within the range that does not exceed PRB offset for another UE. That is, frequency hopping for the PSFCH transmission of the UE 1 may be performed within the range that does not exceed a PRB index in which the PSFCH transmission of the UE 2 is performed. However, it is provided as an example only and the present disclosure is not limited thereto.

Figure 14C:
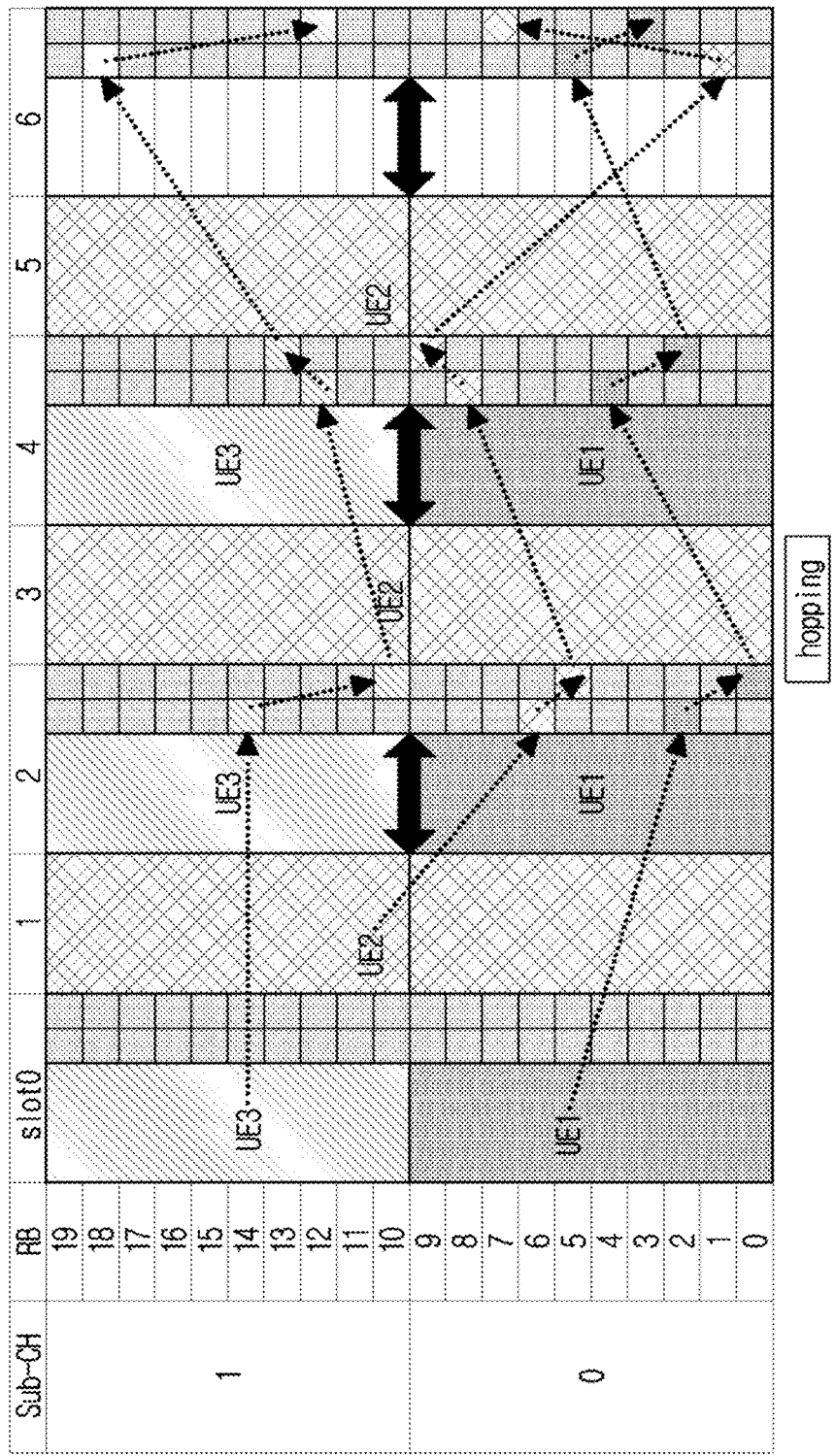

Also, for example, FIG. 14c illustrates a case of $N_{RB}^{sub}=10$. That is, a subchannel includes 10 RBs. Here, for example, frequency hopping may be performed based on the above equations per OFDM symbol in each subchannel. Here, for example, referring to FIG. 14c, the UE 1 may receive a PSCCH/PSSCH or PSSCH through a subchannel 0 in a slot 0. Here, the UE 1 may transmit HARQ feedback information about PSSCH received in last two OFDM symbols of a slot 2. That is, the UE 1 may perform PSFCH transmission for the PSSCH received in the last two OFDM symbols of the slot 2. Here, for example, frequency hopping may be performed based on the above equations in OFDM symbols in which the PSFCH transmission is performed. Also, the UE 2 may receive the PSCCH/PSSCH or the PSSCH through subchannels 0 to 1 in a slot 1. Here, the UE 2 may transmit HARQ feedback information about the PSSCH received in the last two OFDM symbols of the slot 2. That is, the UE 2 may perform PSFCH transmission for the PSSCH received in the last two OFDM symbols of the slot 2. Here, for example, frequency hopping may be performed based on the above equations in OFDM symbols in which the PSFCH transmission is performed. Also, UE 3 may receive a PSCCH/PSSCH or PSSCH through the subchannel 1 in the slot 0. Here, the UE 3 may transmit HARQ feedback information about the PSSCH received in the last two OFDM symbols of the slot 2. That is, the UE 3 may perform PSFCH transmission for the PSSCH received in the last two OFDM symbols of the slot 2. Here, for example, frequency hopping may be performed based on the above equations in OFDM symbols in which the PSFCH transmission is performed.

Here, for example, a PRB offset value for frequency hopping may be determined by considering a potential collision with other UEs. For example, referring to FIG. 14c, all of the PSFCH transmission of the UE 1 and the PSFCH transmission of the UE 2 may be performed in the slot 2. Here, for example, as described above, each UE may transmit each PSFCH based on a different PRB index in the same slot based on PRB offset. Here, for example, frequency hopping may be performed within the range that does not exceed PRB offset for another UE. That is, frequency hopping for the PSFCH transmission of the UE 1 may be performed within the range that does not exceed a PRB index in which the PSFCH transmission of the UE 2 is performed. However, it is provided as an example only and the present disclosure is not limited thereto.

Also, for example, as described above, in the case of applying frequency hopping based on a slot unit and performing PSFCH transmission using at least one OFDM symbol in a single slot, the PSFCH transmission may be performed per OFDM symbol based on a PRB that is determined by the aforementioned method and may be repeatedly performed through the same PRB even for another OFDM symbol in the same slot. In the aforementioned case, frequency hopping may be applied based on a slot unit and frequency hopping may not be applied based on an OFDM symbol unit. However, it is provided as an example only. Alternatively, for example, the PSFCH transmission using at least one OFDM symbol in a single slot may be repeatedly performed. In this case, a single PSFCH format may be mapped on at least one OFDM symbol. However, it is provided as an example only and the present disclosure is not limited thereto.

Also, for example, the PSFCH transmission may be classified based on a code resource. For example, a collision between PSFCH transmission resources may be avoided by applying a PRB offset value of $$\left\lfloor \frac{N_{RB}^{sub}}{N_{slot}^{HARQ}} \right\rfloor$$

and/or a cyclic shift hopping value per slot index in a single HARQ association slot set.

In detail, a cyclic shift value may be set in association with cyclic shift hopping to avoid the collision between the PSFCH transmission resources. That is, the cyclic shift value needs to be set in the aforementioned PSFCH transmission resource. For example, even for the same base sequence, the effect of interference may be minimized due to different CS hopping. For example, a PSFCH format may forward HARQ feedback information based on Zadoff-Chu (ZC) sequence. Here, for example, in the existing PUCCH format, ACK/NACK may be classified based on sequence. Similar to the PUCCH format, the PSFCH format may classify ACK/NACK based on sequence. However, it is provided as an example only. By considering the above aspect, a cyclic shift hopping operation may be performed and may operate based on the following Equation 14.

$$\alpha_l = \frac{2\pi}{N_{sc}^{RB}}\left((m_0 + m_{cs} + n_{cs}(n_{s,f}^\mu, l+l'))\bmod N_{sc}^{RB}\right) \qquad \text{[Equation 14]}$$

Here, for example, in Equation 14, $n_{s,f}^\mu$ denotes a slot index in a DFN or sidelink (SL) radio frame according to a subcarrier spacing value μ. Here, 1 denotes an OFDM symbol number in the PSFCH transmission, a first symbol for the PSFCH transmission l=0, and a second symbol l=1. Also, l' denotes an OFDM symbol index in a slot in which the PSFCH transmission is present and $m_0$ denotes an initial cyclic shift value. Here, the cyclic shift value may be determined based on the following Equation 15 as a start offset value.

$$m_0 = n_{ID}^{SL} \text{ or } m_0 = \left(n_{ID}^{SL} + \left\lfloor \frac{n_{ID}^G}{N_{CDM}^{RB}} \right\rfloor\right) \text{ or } m_0 = \left(n_{ID}^{SL} + n_{ID}^G\right) \quad \text{[Equation 15]}$$

That is, $m_0$ may be determined by considering only SL layer-ID. Alternatively, $m_0$ may be determined by further considering SL layer-ID and $$\left\lfloor \frac{n_{ID}^G}{N_{CDM}^{RB}} \right\rfloor.$$

Alternatively, $m_0$ may be determined based on the SL layer-ID and group member ID. However, it is provided as an example only. Here, for example, in the case of unicast, $n_{ID}^G=0$. Therefore, in the case of unicast, $m_0$ may be determined based on only SL layer-ID. Also, for example, in the case of groupcast, different groups having mutually independent groupcast link ID values may use mutually independent cyclic shift values between groups for the PSFCH transmission.

Also, in Equation 14, $m_{cs}$ may be determined based on whether an HARQ-ACK value is 1 bit or 2 bits. Here, for example, $m_{cs}$ may be determined based on the following Table 15 and Table 16. Here, for example, the following Table 15 may represent a value of $m_{cs}$ about 1-bit HARQ-ACK as a case of receiving a PSSCH that transmits a single Transport Block (TB). Also, for example, Table 16 may represent a value of $m_{cs}$ about 2-bit HARQ-ACK as a case of receiving a PSSCH that transmits two TBs. Here, in the case of an HARQ-ACK (ACK/NACK-based) value, ACK may be "0" and NACK may be "1." Also, for example, in the case of groupcast transmission, Rx UEs may transmit only NACK. Here, NACK may be defined as "0." That is, Rx UEs may not perform PSFCH transmission in the case of ACK.

TABLE 15

| HARQ-ACK value | 0 | 1 |
|---|---|---|
| Sequence cyclic shift | $m_{cs} = 0$ | $m_{cs} = 6$ |

TABLE 16

| HARQ-ACK value | {0,0} | {0,1} | 1,1} | (1,0} |
|---|---|---|---|---|
| Sequence cyclic shift | $m_{cs} = 0$ | $m_{cs} = 3$ | $m_{cs} = 6$ | $m_{cs} = 9$ |

Also, for example, a function $n_{cs}(n_c, l)$ of hopping a cyclic shift value on a time domain may be represented as the following Equation 16. Here, in the following Equation 16, a different cyclic shift hopping scheme may be determined per slot and per OFDM symbol.

Also, for example, the cyclic shift value may be determined based on random sequence. Here, for example, as described above, in the case of using the random sequence, the cyclic shift value may be determined based on an initial value $c_{init} = n_{ID}^{SL}$, and $n_{ID}^{SL}$ may be determined based on the above Table 13. Here, the cyclic shift value may be selected and used from the sequence generated based on the initial value. However, it is provided as an example and the present disclosure is not limited thereto.

$$n_{cs}(n_{s,f}^\mu, l) = \sum_{m=0}^{7} 2^m c\left(8 N_{symb}^{slot} n_{s,f}^\mu + 8l + m\right) \quad \text{[Equation 16]}$$

Figure 15:
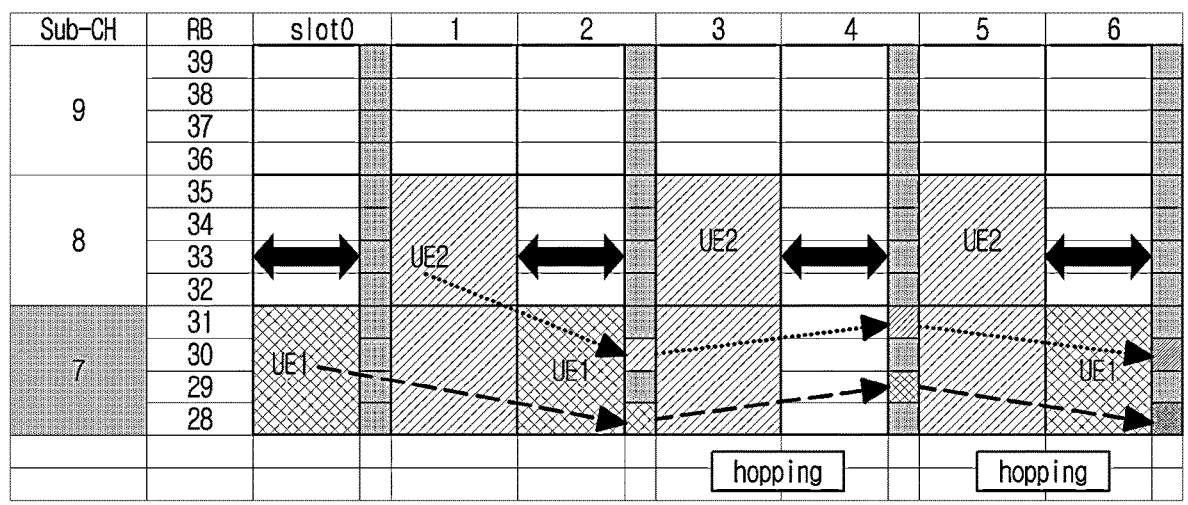
FIG. 15 illustrates a method of performing frequency hopping by applying a frequency resource allocation method and a code resource allocation method.

For example, FIG. 15 illustrates a method of performing frequency hopping by applying a frequency resource allocation method and a code resource allocation method. Referring to FIG. 15, UE 1 may receive a PSCCH/PSSCH or PSSCH in a subchannel 7 within a slot 0. Also, UE 2 may receive a PSCCH/PSSCH or PSSCH in subchannels from a subchannel 7 to a subchannel 8 within a slot 1. Here, the UE 1 may perform PSFCH transmission for the received PSSCH in a slot 2. Also, the UE 2 may perform PSFCH transmission for the received PSSCH in the slot 2. Here, for example, as described above, the PSFCH transmission of the UE 1 and the PSFCH transmission of the UE 2 may be performed through different PRBs based on PRB offset. Also, for example, as described above, the PSFCH transmission of the UE 1 and the PSFCH transmission of the UE 2 may be performed through frequency hopping. Here, for example, code resource allocation represents a different code resource in a different color. Referring to the figure, a code resource for each resource to be hopped may be differently allocated. That is, as described above, a sequence may be generated by determining code resources for final PSFCH transmission based on at least different SL layer-ID values on different time domains.

FIG. 16 illustrates a method of transmitting a PSFCH in response to receiving a plurality of PSSCHs in a single unicast/groupcast. Referring to FIG. 16, a UE may receive a PSSCH in each of a plurality of slots and may transmit HARQ feedback information about the received PSSCHs. Here, for example, in FIG. 12b, the UE 3 may receive the PSCCH/PSSCH or the PSSCH in subchannels from the subchannel 0 to the subchannel 3 within the slot 0. Here, the UE 3 may prepare and transmit HARQ feedback in the PSFCH resource in the slot 2. Also, the UE 3 may receive the PSCCH/PSSCH or the PSSCH in the subchannel 7 within the slot 1. Here, the UE 3 may prepare and transmit HARQ feedback in the PSFCH resource within the slot 2. That is, the UE 3 of 12b may receive the PSSCH in each of two slots. Here, for example, as described above, the UE 3 may determine a reference slot for the PSFCH transmission and may perform the PSFCH transmission. For example, the reference slot may be a first slot and/or a last slot. For example, in FIG. 12b, the reference slot may be a last slot in which the PSSCH is received. Here, for example, in FIG. 12b, the UE 3 may transmit HARQ feedback information about each received PSSCH. Therefore, the UE 3 may need to transmit a plurality of HARQ feedback bits. For example, the UE 3 may drop a portion of the HARQ feedback bits. If not dropped, the UE 3 may perform transmission based on a PSFCH format capable of receiving a large number of HARQ feedback bits.

Here, for example, the UE of FIG. 16 may perform the PSCCH/PSSCH or PSSCH transmission in subchannels from subchannel 0 to subchannel 1 within a slot 1 and may perform the PSCCH/PSSCH or PSSCH transmission in subchannels from subchannel 0 to subchannel 1 within a slot 2. Here, for example, if the number of HARQ feedback bits is 1 bit or 2 bits, the UE may transmit HARQ feedback information using the aforementioned sequence-based PSFCH format. In contrast, if the number of HARQ feedback information bits is greater than 2 bits, the UE may use another PSFCH format to be transmitted on a plurality of PRBs. For example, the UE may selectively use a different PSFCH format based on an HARQ-ACK codebook size.

In detail, if the number of HARQ feedback bits is greater than 2 bits, the UE may transmit corresponding HARQ feedback bit information on at least one PRB through the sequence-based PSFCH format. Here, the number of PRBs to be used may be determined by considering the number of HARQ feedback bits and a target code rate (e.g., ½, ¼, ⅛ . . . ). As another example, the UE may transmit at least 2 bits of HARQ feedback bit information using a demodulation symbol-based PSFCH format associated with a modulation symbol, instead of using the sequence-based PSFCH format.

Here, for example, as described above, in the case of receiving the PSSCH in at least one slot, the UE may perform the PSFCH transmission for each PSSCH. For example, in FIG. 16, the UE receives the PSSCH through a resource having the same reference subchannel index in a different slot. However, it is provided as an example only. Also, for example, as described above, the PSFCH format may be present in various forms. Here, for example, in the following, a case in which the PSFCH is transmitted on a single PRB based on a sequence is referred to as PSFCH format 0. However, it is provided as an example only and the present disclosure is not limited to the PSFCH format name. That is, it may apply alike to a case in which the PSFCH is transmitted on a single PRB based on a sequence.

Figure 16A:
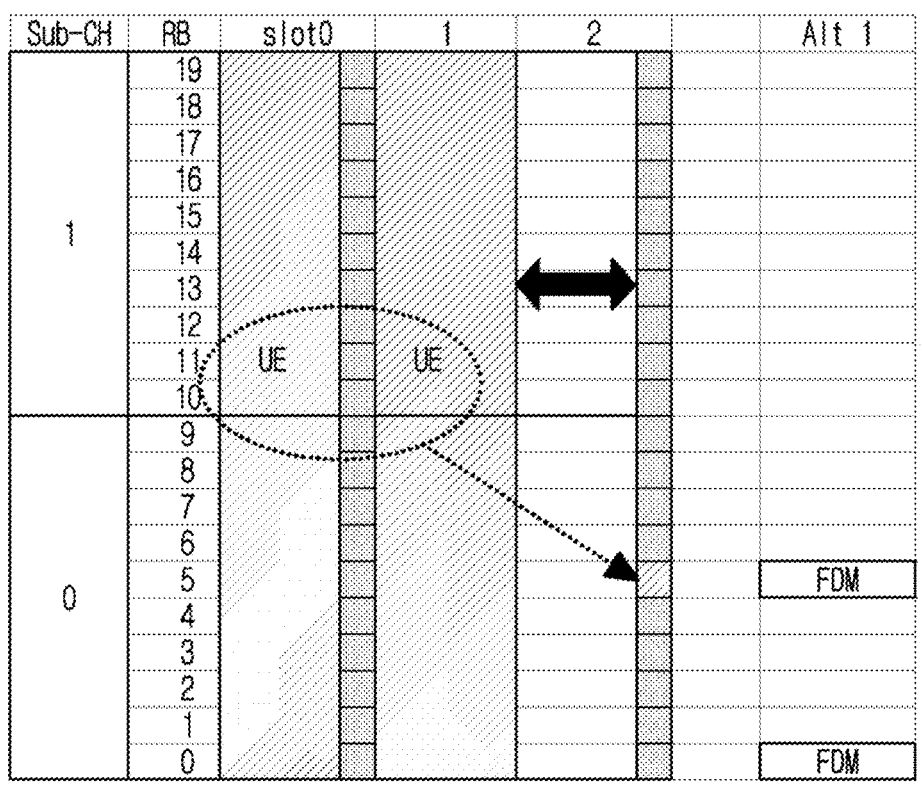

In detail, referring to FIG. 16*a*, the UE may receive the PSSCH through the same subchannel, that is, each of the subchannel 0 and the subchannel 1 in the slot 0 and the slot 1. Here, the UE may simultaneously perform at least one PSFCH transmission using at least one PSFCH resource associated with each slot. That is, each PSFCH transmission may be performed through a different PRB corresponding to each slot in the slot 2. For example, if a single slot is associated based on FIG. 16*a*, the PSFCH transmission may be expanded. For example, the aforementioned function may be supported through capability of the UE. For example, if the UE is capable of supporting the aforementioned function, the UE may perform the PSFCH transmission through "Simultaneous PSFCH format 0" transmission scheme.

Figure 16B:
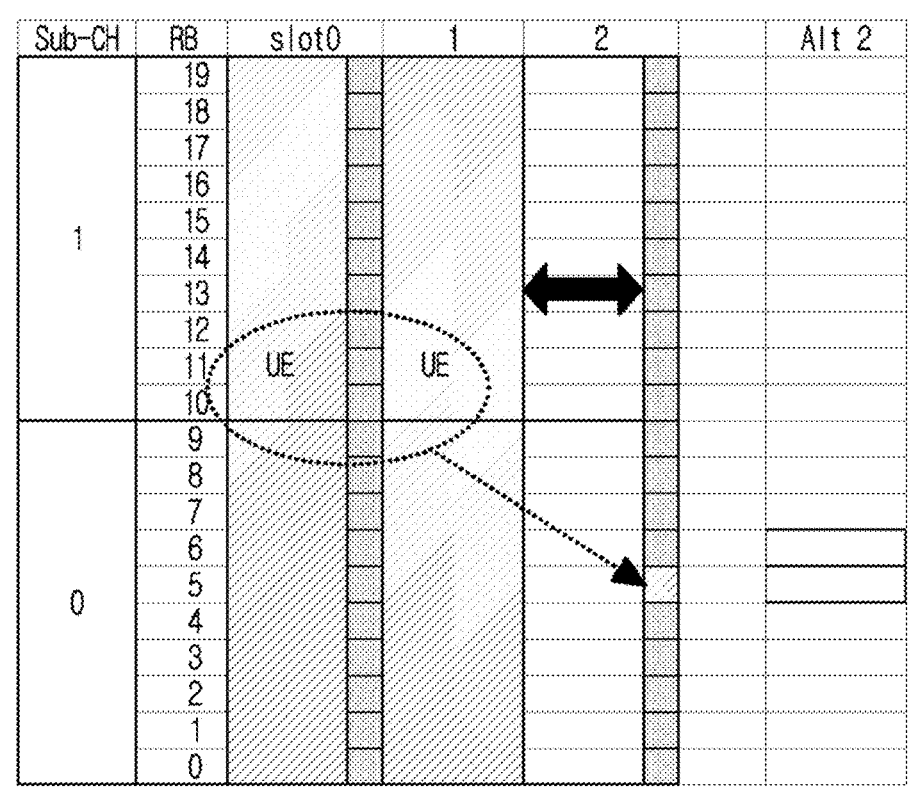

As another example, referring to FIG. 16*b*, the UE may receive the PSSCH through the same subchannel, that is, each of the subchannel 0 and the subchannel 1 in the slot 0 and the slot 1. Here, the UE may simultaneously perform PSFCH transmission on at least one continuous PRB. Here, for example, the number of continuous PRBs may be determined based on the number of HARQ feedback bits to be transmitted by the UE. As described above, the UE may perform efficient transmission rather than transmitting HARQ feedback information through a discontinuous PRB. Here, for example, if the UE performs the PSFCH transmission on at least one continuous PRB, it may be referred to as "PSFCH format 0 with multiple PRBs" based on the aforementioned PSFCH format 0. That is, the number of continuous PRBs may increase based on a size of the number of HARQ feedback information bits in a case in which the UE transmits HARQ feedback information through a single PRB. However, it is provided as an example only. Also, for example, as the PSFCH format, the PSFCH format capable of receiving a plurality of HARQ feedback information on at least one PRB and a modulation symbol may be referred to as PSFCH format 1. However, it is provided as an example only and the present disclosure is not limited to the name.

Figure 16C:
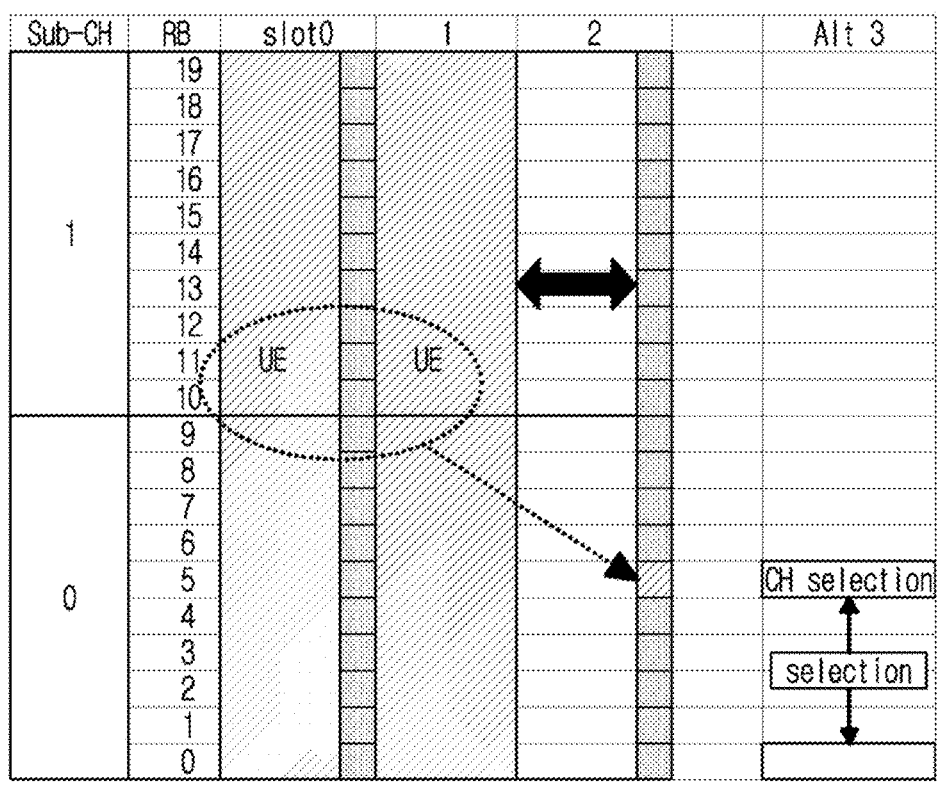
Figure 16D:
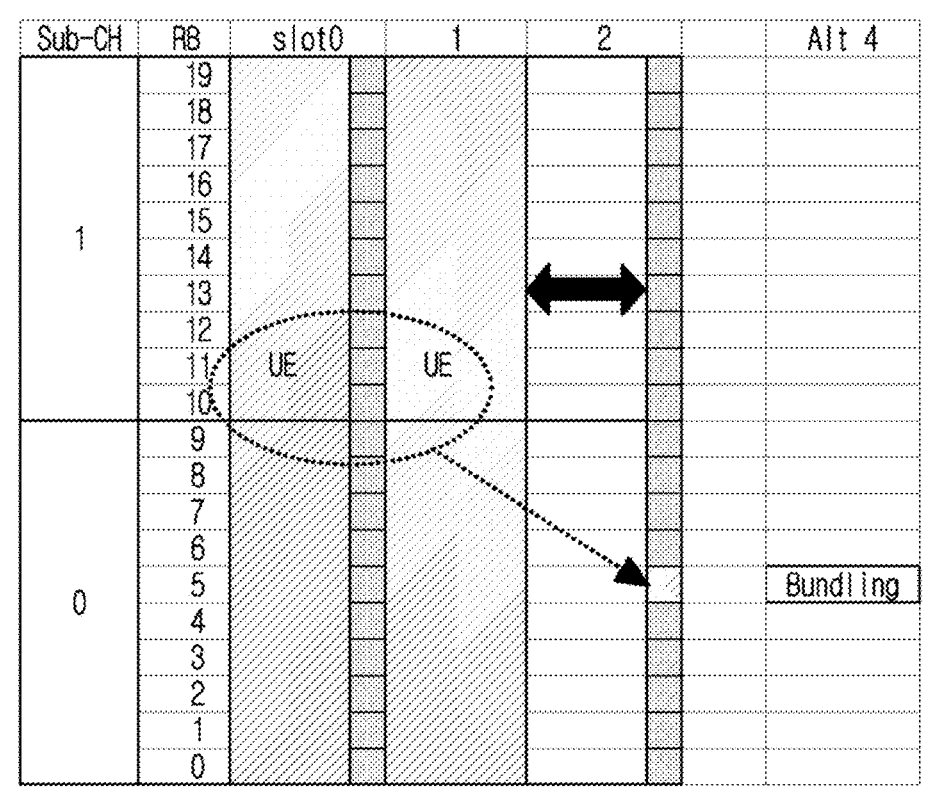

Also, for example, referring to FIG. 16*c*, the UE may receive the PSSCH through the same subchannel, that is, each of the subchannel 0 and the subchannel 1 in the slot 0 and the slot 1. Here, for example, the UE may transmit HARQ feedback information through a table combined based on information about at least one of a frequency resource, a code resource, and an HARQ-ACK state of PSFCH format 0. Here, the UE may perform PSFCH format 0 transmission by selecting a single specific frequency resource and/or code resource based on HARQ-ACK information results by referring to the table. However, it is provided as an example only and the present disclosure is not limited thereto.

For example, in FIG. 16*c*, the UE may transmit HARQ feedback information through a single PRB by selecting a single frequency resource and/or code resource based on an HARQ-ACK state of each of slots.

Also, for example, referring to 16*d*, the UE may receive the PSSCH through the same subchannel, that is, each of the subchannel 0 and the subchannel 1 in the slot 0 and the slot 1. Here, the UE may transmit HARQ feedback information about each slot through bundling. For example, the UE may perform bundling in a time domain and may transmit HARQ feedback information. In detail, for example, the UE may generate HARQ feedback information bits corresponding to 1 or 2 bits by applying time domain bundling to ACK/NACK information for the PSSCH transmitted in the slot 0 and ACK/NACK information for the PSSCH transmitted in the slot 1. Next, the UE may transmit the generated HARQ feedback information bits in a single PSFCH frequency resource. Also, for example, the UE may transmit HARQ feedback bits in a single PSFCH frequency resource by applying bundling in a spatial domain. However, it is provided as an example only and the present disclosure is not limited thereto.

Figure 17:
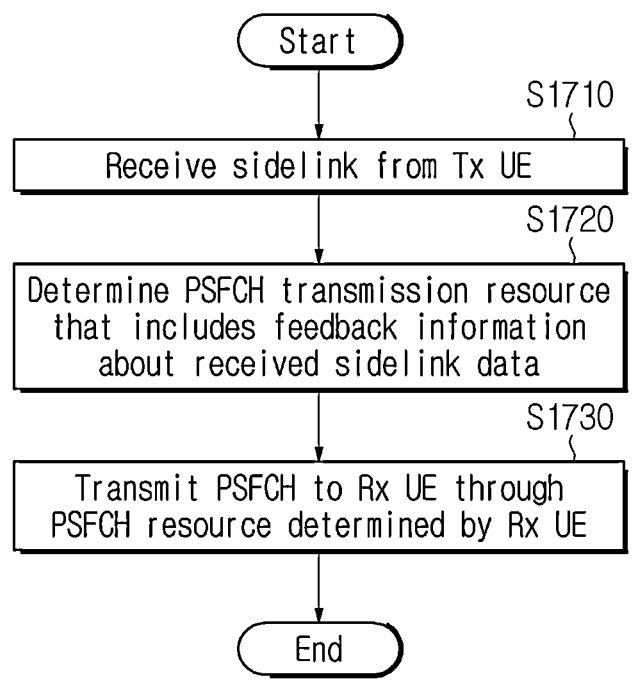
FIG. 17 illustrates a method of performing HARQ feedback according to an example of the present disclosure.

FIG. 17 illustrates a method of transmitting HARQ feedback information according to an example of the present disclosure.

Referring to FIG. 17, an Rx UE may receive, from a Tx UE, a PSCCH/PSSCH or a PSSCH based on unicast/groupcast transmission on a sidelink (S1710). Here, as described above with reference to FIGS. 12 to 16, the PSCCH/PSSCH may be transmitted using the number of subchannels. Here, a single subchannel may be an available resource index on a frequency domain. Also, the subchannel may include at least one PRB. A subchannel composition may be determined through at least one of upper layer signaling (e.g., SL RRC signaling) and pre-configuration.

Next, the Rx UE may determine a PSFCH transmission resource that includes feedback information about the received PSSCH (S1720). Here, as described above with reference to FIGS. 12 to 16, the PSFCH may be configured based on at least one PRB on the frequency domain. Also, for example, the PSFCH resource may be configured to be present on a physical resource every N slots. Here, as described above, a value of N may be set to the UE through at least one of upper layer signaling and pre-configuration. Also, the PSFCH transmission may be performed based on an HARQ association slot set. Here, as described above, the HARQ association slot set may represent a set of associated PSSCH transmissions for HARQ feedback transmission.

Next, the Rx UE may transmit the PSFCH to the Rx UE through the determined PSFCH resource (S1730). Here, as described above with reference to FIGS. 12 to 16, the PSFCH transmission resource may be determined by considering a collision of PSFCH transmission resources between unicast/groupcast Tx UEs. That is, a PRB index for the PSFCH transmission may be determined. Here, for example, if the PSFCH is mapped on at least one PRB, the determined PRB index may be a start (or last) index of mapping. That is, the PRB index for the PSFCH transmission may be determined and a frequency resource for the PSFCH transmission may be mapped based on the determined PRB index. Here, for example, in a subchannel in which the PSFCH is transmitted, the PRB index of the PSFCH may be determined based on at least one of a PRB offset, a subchannel index, a slot index, and the number of RBs per subchannel. Also, for example, the PRB index in which the PSFCH is transmitted may be differently set based on the above equations. However, it is provided as an example only and the present disclosure is not limited thereto.

Figure 18:
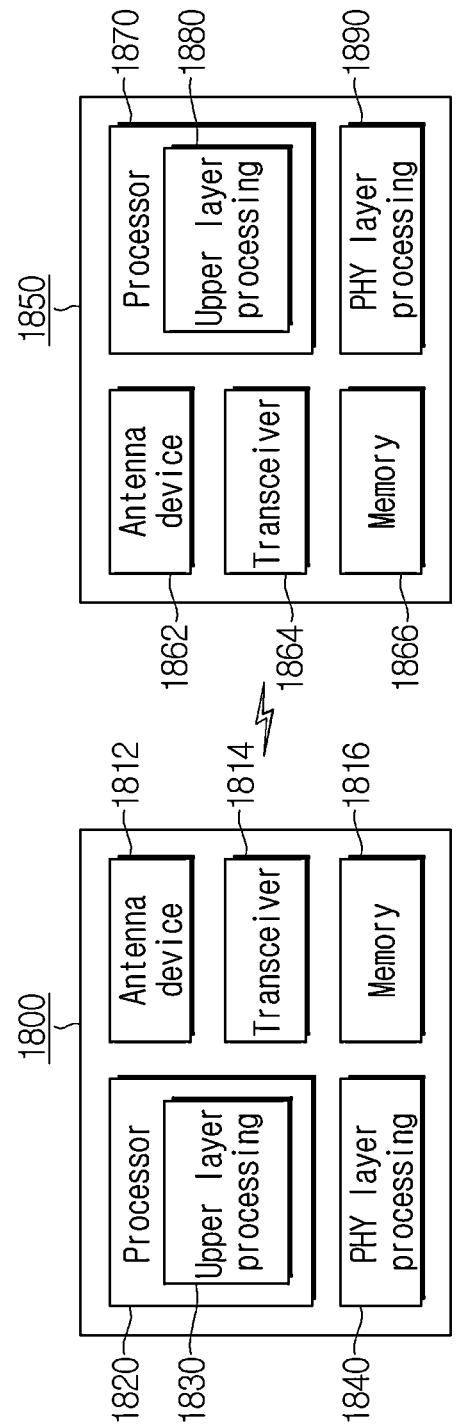
FIG. 18 illustrates a configuration of a base station device and a terminal device according to an example of the present disclosure.

FIG. 18 illustrates a base station device and a terminal device.

Referring to FIG. 18, the base station device 1800 may include a processor 1820, an antenna device 1812, a transceiver 1814, and a memory 1816.

The processor 1820 may perform baseband-related signal processing and may include an upper layer processing 1830 and a physical (PHY) layer processing 1840. The upper layer processing 1830 may process an operation of a Medium Access Control (MAC) layer, a Radio Resource Control (RRC) layer, or more upper layers. The PHY layer processing 1840 may process an operation (e.g., uplink received signal processing and downlink transmission signal processing) of a PHY layer. The processor 1820 may control the overall operation of the base station device 1800 in addition to performing the baseband-related signal processing.

The antenna device 1812 may include at least one physical antenna. If the antenna device 1812 includes a plurality of antennas, MIMO transmission and reception may be supported. The transceiver 1814 may include a radio frequency (RF) transmitter and an RF receiver. The memory 1816 may store operation processed information of the processor 1820 and software, an operating system (OS), an application, etc., associated with an operation of the base station device 1800, and may include a component such as a buffer.

The processor 1820 of the base station device 1800 may be configured to implement an operation of a base station in the examples disclosed herein.

The terminal device 1850 may include a processor 1870, an antenna device 1862, a transceiver 1864, and a memory 1866.

The processor 1870 may perform baseband-related signal processing and may include an upper layer processing 1880 and a PHY layer processing 1890. The upper layer processing 1880 may process an operation of a MAC layer, an RRC layer, or more upper layers. The PHY layer processing 1890 may process an operation (e.g., downlink received signal processing and uplink transmission signal processing) of a PHY layer. The processor 1870 may control the overall operation of the terminal device 1850 in addition to performing the baseband-related signal processing.

The antenna device 1862 may include at least one physical antenna. If the antenna device 1862 includes a plurality of antennas, MIMO transmission and reception may be supported. The transceiver 1864 may include an RF transmitter and an RF receiver. The memory 1866 may store operation processed information of the processor 1870 and software, an OS, an application, etc., associated with an operation of the terminal device 1850, and may include a component such as a buffer.

The processor 1870 of the terminal device 1850 may be configured to implement an operation of a terminal in the examples described herein.

In detail, for example, the processor 1820 of the base station device 1800 may provide, to the terminal device 1850, and thereby set at least one of a slot, an OFDM symbol, and an offset $\Delta_t$ value with respect to a PSFCH time/frequency resource. As another example, the processor 1820 of the base station device 1800 may provide, to the terminal device 1850, and thereby set at least one of the slot, the OFDM symbol, and the offset $\Delta_t$ value with respect to the PSFCH time/frequency resource through DCI.

Also, for example, the processor 1820 of the base station device 1800 may provide information about a number of PSFCH frequency resource RBs/subchannels to the terminal device 1850. Also, for example, the processor 1820 of the base station device 1800 may provide information about an offset $\Delta_f$ value about a start location of the PSFCH frequency resource to the terminal device 1850. For example, the processor 1820 of the base station device 1800 may provide information about the offset $\Delta_f$ value to the terminal device 1850 through DCI.

Also, for example, the processor 1820 of the base station device 1800 may provide, to the terminal device 1850, information regarding whether to apply frequency hopping of the PSFCH.

Also, for example, the processor 1820 of the base station device 1800 may provide information about unicast/groupcast transmission to the terminal device 1850.

Also, for example, the processor 1820 of the base station device 1800 may provide, to the terminal device 1850, information about a total number of code resources capable of classifying HARQ feedback transmission using different sequences within a single RB.

Also, for example, the processor 1820 of the base station device 1800 may provide information about the number of PRBs per subchannel to the terminal device 1850.

Also, for example, the processor 1870 of the terminal device 1850 may provide sidelink communication with another terminal device based on the aforementioned information. Here, the processor 1870 of the terminal device 1850 may transmit a PSCCH/PSSCH or PSSCH to the other terminal device. Also, the processor 1870 of the terminal device 1850 may receive a PSFCH for the PSSCH from the other terminal device. Here, a resource used to transmit the PSFCH may be determined based on the aforementioned description.

Also, for example, the processor 1870 of the terminal device 1850 may perform sidelink communication with the other terminal device. Here, for example, the processor 1870 of the terminal device 1850 may provide, to the other terminal device, and thereby set at least one of a slot, an OFDM symbol, and an offset $\Delta_t$ value with respect to a PSFCH time resource. As another example, the processor 1870 of the terminal device 1850 may provide, to the other terminal device, and thereby set at least one of the slot, the OFDM symbol, and the offset $\Delta_t$ value with respect to the PSFCH time resource through SCI.

Also, for example, the processor 1870 of the terminal device 1850 may provide information about the number of PSFCH frequency resource RBs/subchannels to the other terminal device. Also, for example, the processor 1870 of the terminal device 1850 may provide information about an offset $\Delta_f$ value about a start location of the PSFCH frequency resource to the other terminal device. For example, the processor 1870 of the terminal device 1850 may provide information about the offset $\Delta_f$ value to the other terminal device through SCI.

Also, based on the aforementioned description, for example, the processor 1870 of the terminal device 1850 may transmit control information about sidelink data to the other terminal device through the PSCCH. Also, the processor 1870 of the terminal device 1850 may transmit data information about the sidelink data to the other terminal device through the PSSCH. Also, for example, the processor 1870 of the terminal device 1850 may transmit feedback information to the other terminal device based on the received sidelink data. Here, the processor 1870 of the terminal device 1850 may transmit feedback information using the determined time resource and frequency resource of the PSFCH.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various examples may be executed on an apparatus or a computer, and a non-transitory computer-readable medium storing such software or instructions to be executable on an apparatus or a computer.

What is claimed is:

1. A method comprising:
    receiving, by a wireless user device, sidelink data via a physical sidelink shared channel (PSSCH), wherein at least a portion of the PSSCH is in a subchannel of a first slot, and wherein the subchannel of the first slot comprises a plurality of physical resource blocks (PRBs);
    determining, based on a subchannel index of the subchannel of the first slot, a resource for physical sidelink feedback channel (PSFCH) transmission, wherein the resource for PSFCH transmission is in a subchannel of a second slot;
    determining, based on a value determined based on a sidelink source identity (ID) and a group member ID, an index of the resource for PSFCH transmission;
    transmitting, via the resource for PSFCH transmission, feedback information associated with the received sidelink data; and
    determining, based on a slot number of the first slot, a PRB offset for determining a frequency location, of the resource for PSFCH transmission, in the subchannel of the second slot,
    wherein a number of slots in a hybrid automatic repeat request (HARQ) associated slot set, $N_{slot}^{HARQ}$, is N, and
    wherein a PSFCH resource exists per every N slots.

2. The method of claim 1, wherein the subchannel index of the subchannel of the first slot comprises the lowest subchannel index among subchannel indexes of a plurality of subchannels, associated with the PSSCH, in the first slot, and
    wherein the PSSCH is in the plurality of subchannels in the first slot.

3. The method of claim 1, wherein the subchannel index of the subchannel of the first slot is lower than a subchannel index of a second subchannel, associated with the PSSCH, in the first slot, and
    wherein a second portion of the PSSCH is in the second subchannel in the first slot.

4. The method of claim 1, wherein the subchannel index of the subchannel of the first slot is equal to a subchannel index of the subchannel of the second slot.

5. The method of claim 1, wherein the PRB offset is determined based on a number of PRBs per subchannel, $N_{RB}^{sub}$, divided by a number of slots in a hybrid automatic repeat request (HARQ) associated slot set, $N_{slot}^{HARQ}$.

6. The method of claim 1, wherein:
    a number of slots in a hybrid automatic repeat request (HARQ) associated slot set, $N_{slot}^{HARQ}$ is 2;
    the first slot is slot n or slot (n+1);
    the resource for PSFCH transmission corresponds to:
    a first PRB resource in the subchannel of the second slot if the first slot is slot n; or
    a second PRB resource in the subchannel of the second slot if the first slot is slot (n+1); and
    a frequency of the first PRB resource is lower than a frequency of the second PRB resource.

7. The method of claim 1, wherein:
    a number of slots in a hybrid automatic repeat request (HARQ) associated slot set, $N_{slot}^{HARQ}$, is 4;
    the first slot is slot n, slot (n+1), slot (n+2), or slot (n+3);
    the resource for PSFCH transmission corresponds to:
    a first PRB resource in the subchannel of the second slot if the first slot is slot n;
    a second PRB resource in the subchannel of the second slot if the first slot is slot (n+1);
    a third PRB resource in the subchannel of the second slot if the first slot is slot (n+2);
    a fourth PRB resource in the subchannel of the second slot if the first slot is slot (n+3),
    a frequency of the first PRB resource is lower than a frequency of the second PRB resource;
    the frequency of the second PRB resource is lower than a frequency of the third PRB resource; and
    the frequency of the third PRB resource is lower than a frequency of the fourth PRB resource.

8. The method of claim 1, wherein a PRB index of the resource for PSFCH transmission is determined based on at least one of:
    a PSFCH format type, a cast type, a sidelink physical layer identifier, a PRB offset, the subchannel index of the subchannel of the first slot, at least one slot index of a hybrid automatic repeat request (HARQ) association set, a number of code resources per PRB, whether to apply frequency hopping, whether to configure a slot aggregation for PSSCH transmission, whether to apply sidelink HARQ-acknowledgement (ACK) bundling, a number of sidelink HARQ-ACK information bits, or a number of PRBs per subchannel.

9. The method of claim 1, further comprising:
    receiving a radio resource control (RRC) message configuring at least one of:
    a quantity of PRBs of PSFCH frequency resources; or
    a quantity of subchannels of the PSFCH frequency resources.

10. The method of claim 1, wherein the index of the resource for PSFCH transmission is at least based on a PSFCH PRB index.

* * * * *